US012394358B2

(12) United States Patent
Jin et al.

(10) Patent No.: US 12,394,358 B2
(45) Date of Patent: Aug. 19, 2025

(54) DISPLAY DEVICE PROVIDING UNIFORM LUMINANCE CHARACTERISTICS EVEN WHEN OPERATION FREQUENCY IS VARIED

(71) Applicant: Samsung Display Co., LTD., Yongin-si (KR)

(72) Inventors: Jakyoung Jin, Yongin-si (KR); Jihye Kim, Yongin-si (KR); Yu-Chol Kim, Yongin-si (KR); Jin-Wook Yang, Yongin-si (KR); Seongoh Yeom, Yongin-si (KR); Eui-Myeong Cho, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/387,293

(22) Filed: Nov. 6, 2023

(65) Prior Publication Data

US 2024/0249661 A1 Jul. 25, 2024

(30) Foreign Application Priority Data

Jan. 19, 2023 (KR) ........................ 10-2023-0008031

(51) Int. Cl.
*G09G 3/32* (2016.01)
*G09G 3/20* (2006.01)

(52) U.S. Cl.
CPC ............. *G09G 3/2096* (2013.01); *G09G 3/32* (2013.01); *G09G 2300/0819* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

| | | | |
|---|---|---|---|
| 9,053,664 | B2 | 6/2015 | Lee |
| 10,586,496 | B2 | 3/2020 | Kim et al. |

(Continued)

FOREIGN PATENT DOCUMENTS

| | | | |
|---|---|---|---|
| CN | 115312004 | A | 11/2022 |
| KR | 101850994 | B1 | 4/2018 |

(Continued)

*Primary Examiner* — Ke Xiao
*Assistant Examiner* — Nelson Lam
(74) *Attorney, Agent, or Firm* — CANTOR COLBURN LLP

(57) ABSTRACT

A display device includes a display panel including a plurality of pixels and a panel driver that drives the display panel in a first mode where an operating frequency is fixed, and a second mode where the operating frequency is variable. Each of the plurality of pixels includes a light-emitting element and a pixel driving circuit connected to a first electrode of the light-emitting element. The panel driver includes a driving controller that determines whether the operating frequency corresponds to one of predetermined compensation frequencies in the second mode, and outputs a voltage control signal depending on the determination result, and a voltage generator that changes a voltage level of an anode initialization voltage applied to the first electrode in response to the voltage control signal.

13 Claims, 22 Drawing Sheets

(52) U.S. Cl.
CPC ............... *G09G 2300/0852* (2013.01); *G09G 2300/0861* (2013.01); *G09G 2310/0294* (2013.01); *G09G 2310/08* (2013.01); *G09G 2320/0233* (2013.01); *G09G 2320/0247* (2013.01); *G09G 2330/028* (2013.01)

(58) Field of Classification Search
CPC .... G09G 3/3233; G09G 3/3241; G09G 3/325; G09G 3/3258; G09G 3/3266; G09G 3/3275; G09G 3/3283; G09G 3/3291
USPC ....................................................... 345/76–83
See application file for complete search history.

(56) References Cited

U.S. PATENT DOCUMENTS

| | | | | |
|---|---|---|---|---|
| 10,937,370 | B2 | 3/2021 | Son | |
| 11,508,317 | B2 | 11/2022 | Ha et al. | |
| 11,508,320 | B2 * | 11/2022 | Kim | G09G 3/3266 |
| 11,545,083 | B2 | 1/2023 | Chung et al. | |
| 11,715,421 | B2 * | 8/2023 | Kim | G09G 3/3233 345/76 |
| 11,817,056 | B2 * | 11/2023 | Kim | G09G 3/3266 |
| 12,094,415 | B2 * | 9/2024 | Kim | G09G 3/3266 |
| 2018/0293944 | A1 * | 10/2018 | Kim | G09G 3/3233 |
| 2021/0118368 | A1 | 4/2021 | In et al. | |
| 2022/0028329 | A1 | 1/2022 | Kim et al. | |
| 2022/0084472 | A1 * | 3/2022 | Kim | G09G 3/3266 |
| 2022/0101785 | A1 * | 3/2022 | Chung | G09G 3/3208 |
| 2022/0122550 | A1 * | 4/2022 | Ha | G09G 3/3233 |
| 2022/0180813 | A1 * | 6/2022 | Yang | G09G 3/3233 |
| 2022/0199025 | A1 * | 6/2022 | Hong | G09G 3/3258 |
| 2023/0108303 | A1 | 4/2023 | Xie | |

FOREIGN PATENT DOCUMENTS

| | | | |
|---|---|---|---|
| KR | 1020200057204 | A | 5/2020 |
| KR | 1020210046910 | A | 4/2021 |
| KR | 102309097 | B1 | 10/2021 |
| KR | 1020220030389 | A | 3/2022 |
| KR | 1020220041509 | A | 4/2022 |

* cited by examiner

| | 11G | 23G | 35G | 51G | 87G | 127G | 151G | 203G | 255G |
|---|---|---|---|---|---|---|---|---|---|
| AINT: -3.5V | **-8.63%** | **-4.84%** | -3.06% | -1.67% | -0.05% | 0.48% | 0.56% | 0.61% | 0.63% |
| AINT: -3.6V | 0.38% | -3.10% | -2.28% | -1.38% | 0.03% | 0.45% | 0.54% | 0.59% | 0.61% |
| AINT: -3.7V | **7.90%** | -1.51% | -1.70% | -1.21% | 0.08% | 0.50% | 0.50% | 0.55% | 0.62% |
| AINT: -3.8V | **15.87%** | 0.20% | -1.19% | -0.95% | 0.10% | 0.47% | 0.53% | 0.44% | 0.60% |

DISPLAY DEVICE PROVIDING UNIFORM LUMINANCE CHARACTERISTICS EVEN WHEN OPERATION FREQUENCY IS VARIED

This application claims priority to Korean Patent Application No. 10-2023-0008031, filed on Jan. 19, 2023, and all the benefits accruing therefrom under 35 U.S.C. § 119, the content of which in its entirety is herein incorporated by reference.

BACKGROUND

1. Field

Embodiments of the disclosure described herein relate to a display device and a driving method thereof, and more particularly, relate to a display device having uniform luminance characteristics and a driving method thereof.

2. Description of the Related Art

A light-emitting display device among display devices displays an image by a light-emitting diode that generates light through recombination of electrons and holes. The light-emitting display device is driven with a relatively low power while providing a relatively fast response speed.

The light-emitting display device includes pixels connected to data lines and scan lines. Each of the pixels generally includes a light-emitting diode, and a pixel circuit unit for controlling the amount of current flowing to the light-emitting diode. In response to a data signal, the pixel circuit unit may control an amount of current that flows from a terminal, to which a first driving voltage is applied, to a terminal, to which a second driving voltage is applied, via the light-emitting diode. In this case, light having predetermined luminance is generated to correspond to the amount of current flowing through the light-emitting diode.

SUMMARY

Embodiments of the disclosure provide a display device that is driven to have uniform luminance characteristics even when an operating frequency is varied, and a driving method thereof.

In an embodiment of the disclosure, a display device includes a display panel including a plurality of pixels and a panel driver that drives the display panel in a first mode where an operating frequency is fixed and a second mode where the operating frequency is variable.

In an embodiment, each of the plurality of pixels may include a light-emitting element and a pixel driving circuit connected to a first electrode of the light-emitting element.

In an embodiment, the panel driver may include a driving controller that determines whether the operating frequency corresponds to one of predetermined compensation frequencies in the second mode, and output a voltage control signal depending on the determination result, and a voltage generator that changes a voltage level of an anode initialization voltage applied to the first electrode in response to the voltage control signal.

In an embodiment of the disclosure, a display device may include a display panel including a plurality of pixels and a panel driver that drives the display panel in a first mode where an operating frequency is fixed and a second mode where the operating frequency is variable.

In an embodiment, each of the plurality of pixels may include a light-emitting element and a pixel driving circuit which is connected to the light-emitting element and receives an emission control signal and an initialization control signal.

In an embodiment, the panel driver may adjust a duty ratio of the emission control signal when, in the second mode, a first area having a first reference grayscale or a grayscale higher than the first reference grayscale is greater than or equal to a first threshold percentage, and adjust a duty ratio of the initialization control signal when, in the second mode, a second area having a second reference grayscale or a grayscale lower than the second reference grayscale is greater than or equal to a second threshold percentage.

In an embodiment, a display device may include a display panel including a plurality of pixels and a panel driver that drives the display panel in a first mode where an operating frequency is fixed and a second mode where the operating frequency is variable.

In an embodiment, each of the plurality of pixels may include a light-emitting element and a pixel driving circuit which is connected to the light-emitting element and receives an emission control signal and an initialization control signal.

In an embodiment, the panel driver may increase a duty ratio of the initialization control signal at a predetermined second reference time point and decrease a duty ratio of the emission control signal at a first reference time point following the second reference time point.

In an embodiment of the disclosure, a display device includes a light-emitting element and a pixel driving circuit which is connected to the light-emitting element and receives an emission control signal and an initialization control signal. A method for driving the display device includes determining whether the display device operates in a variable frequency mode in which an operating frequency is variable; determining whether a first area having a first reference grayscale or a grayscale higher than the first reference grayscale is greater than or equal to a first threshold percentage; adjusting a duty ratio of the emission control signal when the first area is greater than or equal to the first threshold percentage; determining whether a second area having a second reference grayscale or a grayscale lower than the second reference grayscale is greater than or equal to a second threshold percentage when the first area is less than the first threshold percentage; and adjusting a duty ratio of the initialization control signal when the second area is greater than or equal to the second threshold percentage.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
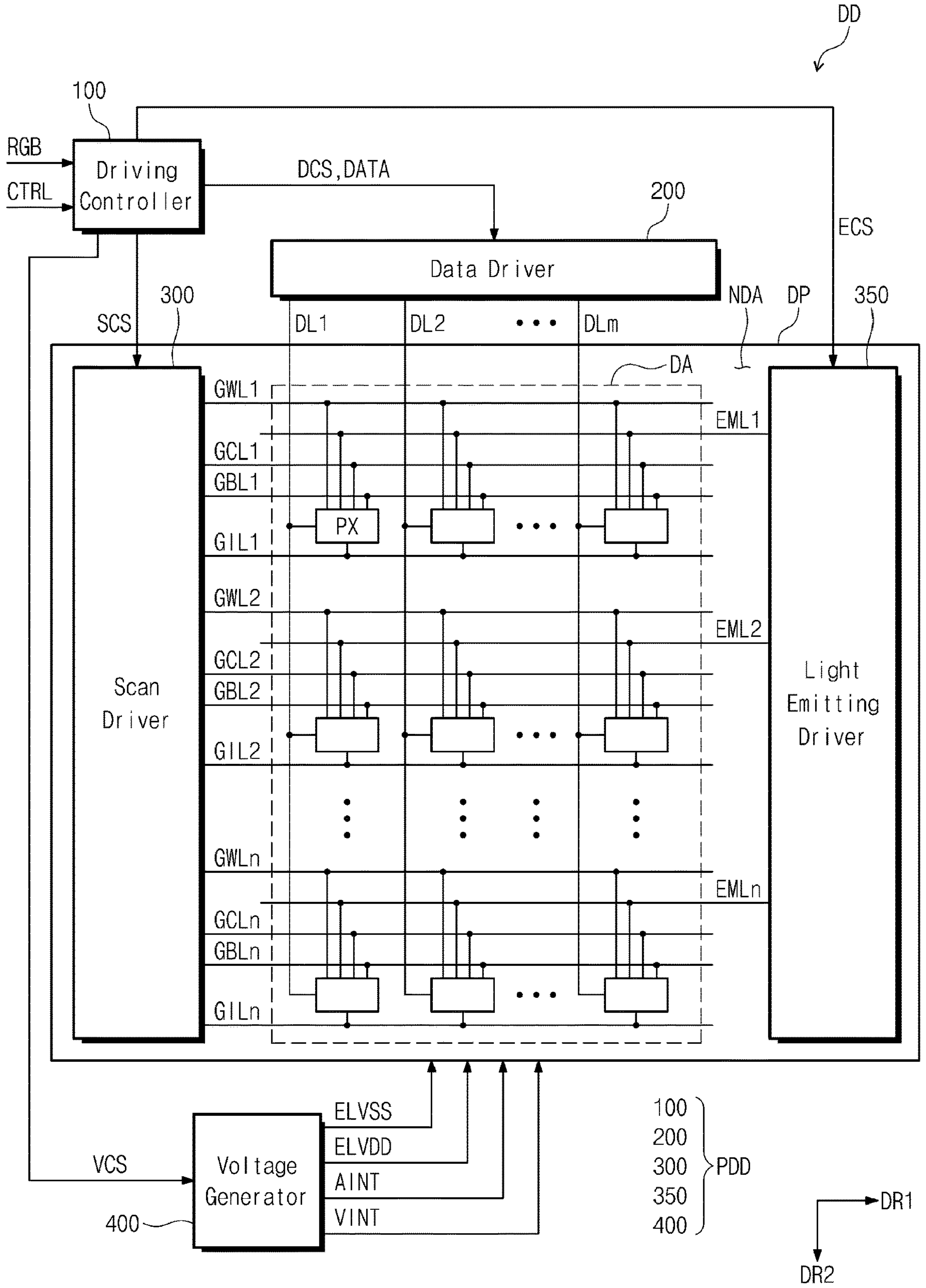
FIG. 1 is a block diagram of an embodiment of a display device, according to the disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a block diagram of an embodiment of a display device, according to the disclosure.

Referring to FIG. 1, a display device DD may be a device that is activated depending on an electrical signal to display an image. The display device DD may be applied to an electronic device such as a smart watch, a tablet personal computer ("PC"), a notebook, a computer, or a smart television.

The display device DD includes a display panel DP and a panel driver PDD that drives the display panel DP. In an embodiment of the disclosure, the panel driver PDD may include a driving controller 100, a data driver 200, a scan driver 300, a light-emitting driver 350, and a voltage generator 400.

The driving controller 100 receives an image signal RGB and a control signal CTRL. The driving controller 100 generates image data DATA by converting a data format of the image signal RGB in compliance with the specification for an interface with the data driver 200. The driving controller 100 outputs a scan control signal SCS, a data control signal DCS, and an emission driving control signal ECS.

The data driver 200 receives the data control signal DCS and the image data DATA from the driving controller 100. The data driver 200 converts the image data DATA into data signals and outputs the data signals to a plurality of data lines DL1 to DLm (m is a natural number) to be described later. The data signals refer to analog data voltages corresponding to grayscale values of the image data DATA.

The voltage generator 400 generates voltages desired to operate the display panel DP. In an embodiment of the disclosure, the voltage generator 400 generates a first driving voltage ELVDD, a second driving voltage ELVSS, an initialization voltage VINT, and an anode initialization voltage AINT. The initialization voltage VINT may have a voltage level different from that of the anode initialization voltage AINT. The voltage generator 400 generates voltages desired to operate the display panel DP. In an embodiment of the disclosure, the voltage generator 400 may further generate a reference voltage Vref (refer to FIG. 2B) supplied to the display panel DP. The reference voltage Vref may have a lower voltage level than that of the first driving voltage ELVDD.

The scan driver 300 receives the scan control signal SCS from the driving controller 100. The scan control signal SCS may include a start signal for starting an operation of the scan driver 300 and a plurality of clock signals. The scan driver 300 generates a plurality of scan signals and sequentially outputs the plurality of scan signals to scan lines described later. The light-emitting driver 350 may output emission control signals to emission control lines EML1 to EMLn (n is a natural number) in response to the emission driving control signal ECS to be described later from the driving controller 100. In an embodiment, the scan driver 300 and the light-emitting driver 350 may be integrated into one circuit.

The scan driver 300 outputs initialization scan signals to initialization scan lines GIL1 to GILn of the display panel DP and outputs compensation scan signals to compensation scan lines GCL1 to GCLn of the display panel DP. The scan driver 300 outputs write scan signals to the write scan lines GWL1 to GWLn of the display panel DP, and outputs black scan signals to the black scan lines GBL1 to GBLn of the display panel DP.

The display panel DP includes the initialization scan lines GIL1 to GILn, the compensation scan lines GCL1 to GCLn, the write scan lines GWL1 to GWLn, the black scan lines GBL1 to GBLn, emission control lines EML1 to EMLn, the data lines DL1 to DLm, and pixels PX. A display area DA and a non-display area NDA are defined in the display panel DP. The initialization scan lines GIL1 to GILn, the compensation scan lines GCL1 to GCLn, the write scan lines GWL1 to GWLn, the black scan lines GBL1 to GBLn, the emission control lines EML1 to EMLn, the data lines DL1 to DLm, and the pixels PX may be arranged in the display area DA. The initialization scan lines GIL1 to GILn, the compensation scan lines GCL1 to GCLn, the write scan lines GWL1 to GWLn, the black scan lines GBL1 to GBLn, and the emission control lines EML1 to EMLn extend in a first direction DR1 and are arranged in a second direction DR2. The data lines DL1 to DLm extend in the second direction DR2 and are arranged in the first direction DR1.

The scan driver 300 and the light-emitting driver 350 may be disposed in the non-display area NDA of the display panel DP. In an embodiment of the disclosure, the scan driver 300 is disposed adjacent to one side of the display area DA, and the light-emitting driver 350 is disposed adjacent to the other side of the display area DA opposite to the one side. In the example shown in FIG. 1, the scan driver 300 and the light-emitting driver 350 are respectively disposed on opposite sides of the display area DA, but the disclosure is not limited thereto. In an embodiment, each of the scan driver 300 and the light-emitting driver 350 may be disposed adjacent to one of one side and the other side of the display panel DP, for example.

The plurality of pixels PX is electrically connected to the initialization scan lines GIL1 to GILn, the compensation scan lines GCL1 to GCLn, the write scan lines GWL1 to GWLn, the black scan lines GBL1 to GBLn, the emission control lines EML1 to EMLn, and the data lines DL1 to DLm. Each of the plurality of pixels PX may be electrically connected to four scan lines and one emission control line. In an embodiment, as illustrated in FIG. 1, a first row of pixels may be connected to the first initialization scan line GIL1, the first compensation scan line GCL1, the first write scan line GWL1, the first black scan line GBL1, and the first emission control line EML1, for example. Moreover, a second row of pixels may be connected to the second initialization scan line GIL2, the second compensation scan line GCL2, the second write scan line GWL2, the second black scan line GBL2, and the second emission control line EML2. However, the number of scan lines connected to each of the pixel PX and the number of emission control lines connected to each of the pixel PX are not limited thereto. In an embodiment, the number of scan lines and the number of emission control lines may be varied, for example.

Each of the plurality of pixels PX includes a light-emitting element ED (refer to FIG. 2A) and a pixel circuit unit PXC (refer to FIG. 2A) for controlling the emission of the light-emitting element ED. The pixel circuit unit PXC may include one or more transistors and one or more capacitors. Through the same process as transistors of the pixel circuit unit PXC, the scan driver 300 and the light-emitting driver 350 may be formed directly in the non-display area NDA of the display panel DP.

Each of the plurality of pixels PX receives the first driving voltage ELVDD, the second driving voltage ELVSS, the initialization voltage VINT, and the anode initialization voltage AINT from the voltage generator 400. In an alternative embodiment, each of the plurality of pixels PX may further receive the reference voltage Vref from the voltage generator 400.

Figure 2A:
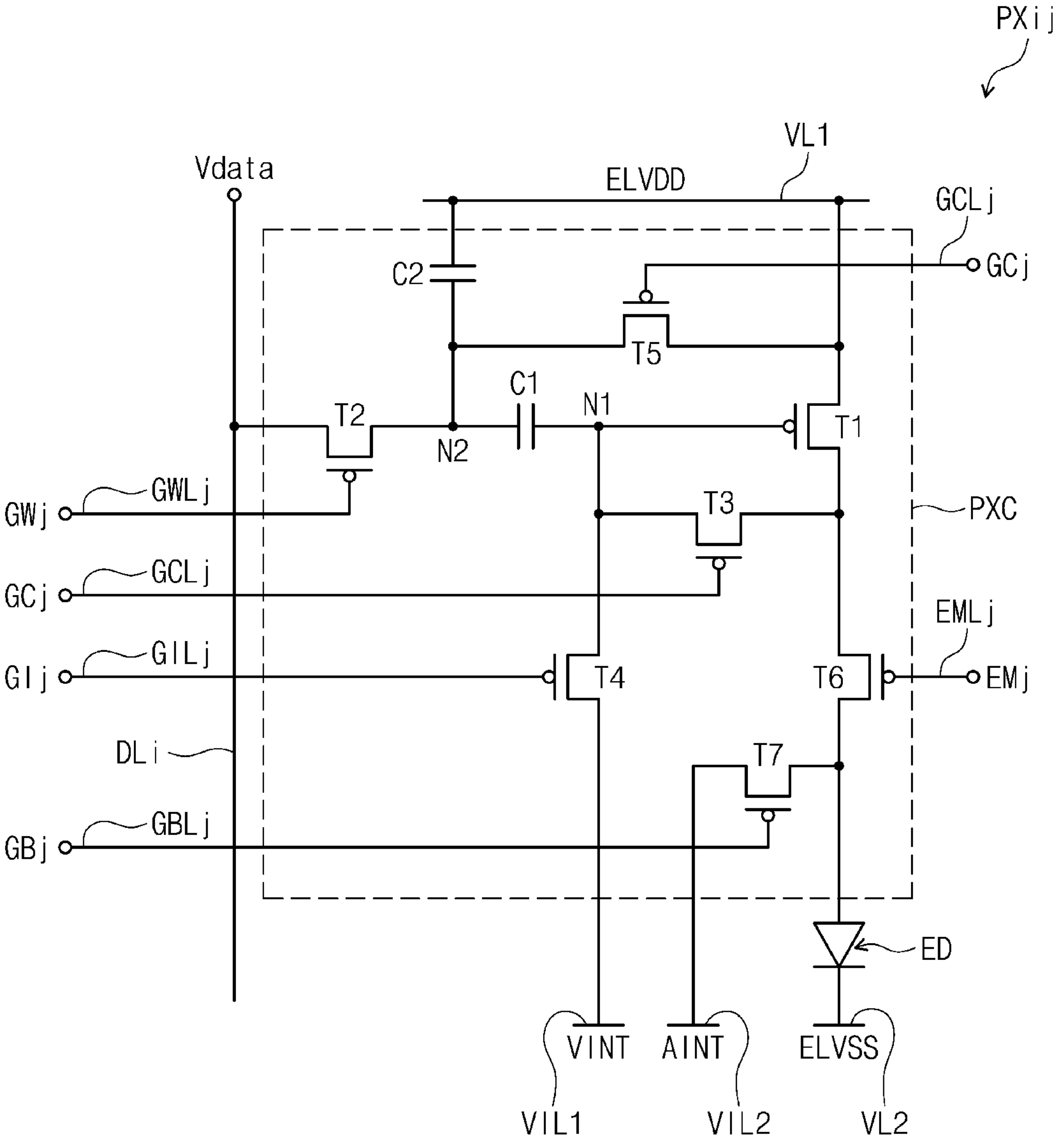
FIGS. 2A and 2B are circuit diagrams of an embodiment of a pixel, according to the disclosure.
Figure 2B:
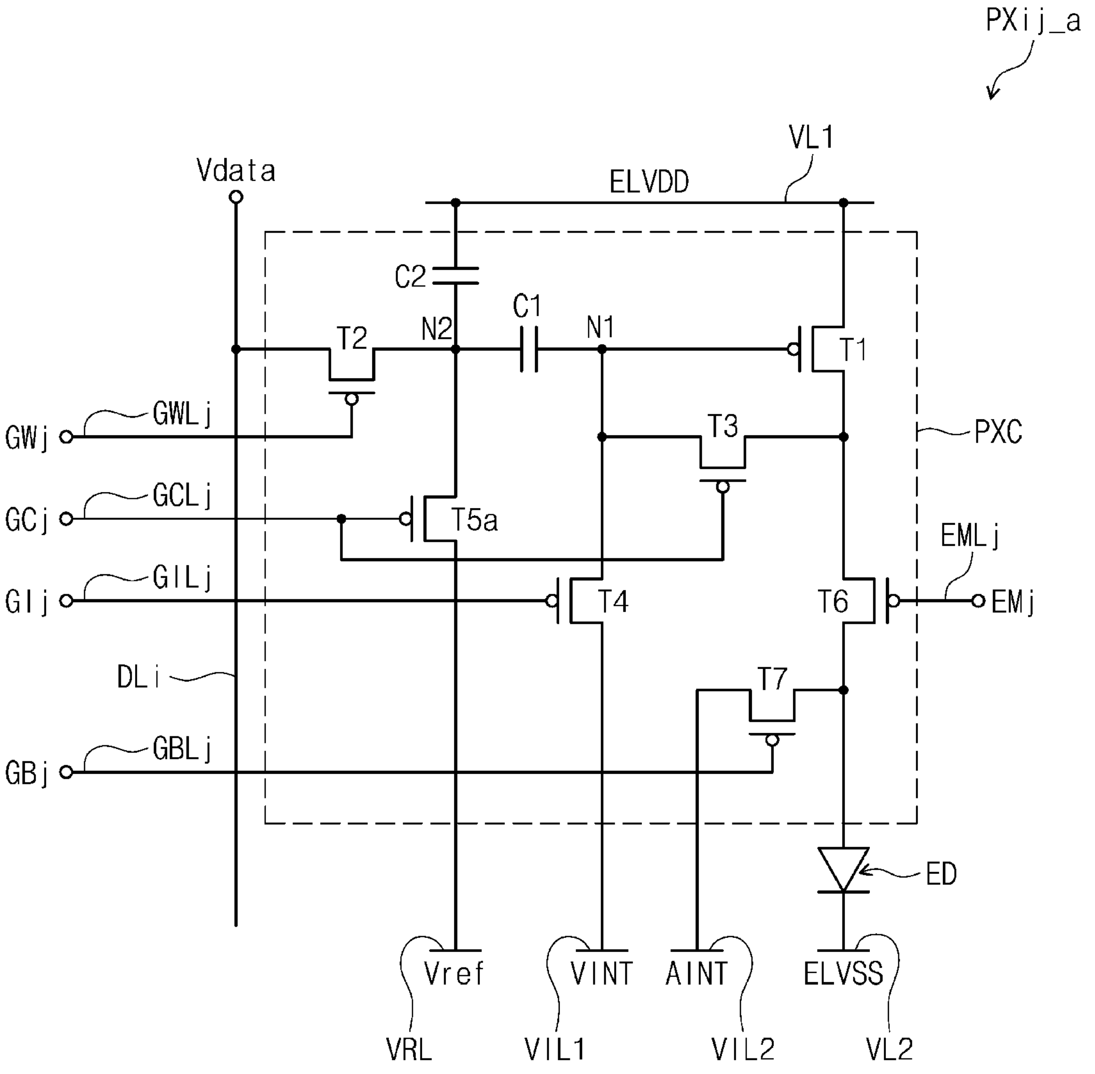

FIGS. 2A and 2B are circuit diagrams of an embodiment of a pixel, according to the disclosure. The pixels PX shown in FIG. 1 may have the same configuration as each other. Accordingly, in FIGS. 2A and 2B, a configuration of one pixel PXij or PXij_a among the pixels PX is described, and configurations of the other pixels are omitted to avoid redundancy.

Referring to FIG. 2A, the pixel PXij is connected to the j-th initialization scan line GILj among the initialization scan lines GIL1 to GILn, the j-th compensation scan line GCLj among the compensation scan lines GCL1 to GCLn, the j-th write scan line GWLj among the write scan lines GWL1 to GWLn, and the j-th black scan line GBLj among the black scan lines GBL1 to GBLn. Moreover, the pixel PXij is connected to the i-th data line DLi among the data lines DL1 to DLm shown in FIG. 1, and is connected to the j-th emission control line EMLj among the emission control lines EML1 to EMLn.

Referring to FIG. 2A, the pixel PXij in an embodiment includes the pixel circuit unit PXC and the light-emitting element ED. In an embodiment of the disclosure, the pixel circuit unit PXC may include seven transistors and two capacitors. Hereinafter, the seven transistors are respectively referred to as "first to seventh transistors T1, T2, T3, T4, T5, T6, and T7". The two capacitors are referred to as "first and second capacitors C1 and C2".

In an embodiment, each of the first to seventh transistors T1 to T7 is a P-type transistor having a low-temperature polycrystalline silicon ("LTPS") semiconductor layer. In an alternative embodiment, each of the first to seventh transistors T1 to T7 may be an N-type transistor. Moreover, at least one of the first to seventh transistors T1 to T7 may be an N-type transistor and the others thereof may be P-type transistors. In an alternative embodiment, at least one of the first to seventh transistors T1 to T7 may be a transistor having an oxide semiconductor layer. In an embodiment, some of the first to seventh transistors T1 to T7 may be oxide semiconductor transistors, and others thereof may be LTPS transistors, for example.

A circuit configuration of the pixel PXij in an embodiment of the disclosure is not limited to the circuit configuration shown in FIG. 2A. The pixel PXij illustrated in FIG. 2A is only an example, and the circuit configuration of the pixel PXij may be modified and implemented.

The j-th initialization scan line GILj supplies a j-th initialization scan signal GIj to the pixel PXij. The j-th write scan line GWLj supplies a j-th write scan signal GWj to the pixel PXij, and the j-th compensation scan line GCLj supplies a j-th compensation scan signal GCj to the pixel PXij. The j-th emission control line EMLj supplies a j-th emission control signal EMj to the pixel PXij, and the i-th data line DLi supplies an i-th data voltage Vdata to the pixel PXij. The i-th data voltage Vdata may have a voltage level corresponding to the image data DATA input to the display device DD (refer to FIG. 1).

The pixel PXij may be connected to a first voltage line VL1, a second voltage line VL2, an initialization voltage line VIL1, an anode initialization voltage line VIL2 and a reference voltage line VRL. The first voltage line VL1 transmits the first driving voltage ELVDD supplied from the voltage generator 400 shown in FIG. 1 to the pixel PXij. The second voltage line VL2 transmits the second driving voltage ELVSS supplied from the voltage generator 400 to the pixel PXij. The initialization voltage line VIL1 and the anode initialization voltage line VIL2 receives the initialization voltage VINT and the anode initialization voltage AINT from the voltage generator 400 and transmits the initialization voltage VINT and the anode initialization voltage AINT to the pixel PXij. The reference voltage line VRL receives a reference voltage Vref from the voltage generator 400 and transmits the reference voltage Vref to the pixel PXij.

Each of the first to seventh transistors T1 to T7 may include an input electrode (or source electrode), an output electrode (or drain electrode), and a control electrode (or gate electrode). In the specification, for convenience of description, the input electrode, the output electrode, and the control electrode may be also referred to as a "first electrode", a "second electrode", and a "third electrode", respectively.

The first transistor T1 (or also referred to as a "driving transistor") may be provided between the first voltage line VL1 and the light-emitting element ED. In detail, the first transistor T1 includes a first electrode electrically connected to the first voltage line VL1, a second electrode electrically connected to the light-emitting element ED, and a third electrode connected to a first node N1. The first transistor T1 may receive the first driving voltage ELVDD through the first voltage line VL1. The second electrode of the first transistor T1 may be electrically connected to the anode of the light-emitting element ED via the sixth transistor T6.

The second transistor T2 may be connected between the i-th data line DLi and a second node N2. In detail, the second transistor T2 includes a first electrode connected to the i-th data line DLi, a second electrode connected to the second node N2, and a third electrode for receiving the j-th write scan signal GWj through the j-th write scan line GWLj. During a data write period, the second transistor T2 is turned on in response to the j-th write scan signal GWj provided to the j-th write scan line GWLj. The i-th data line DLi and the second node N2 may be electrically connected by the turned-on second transistor T2. The i-th data voltage Vdata applied to the i-th data line DLi may be applied to the second node N2 through the turned-on second transistor T2.

The first capacitor C1 is connected between the first node N1 and the second node N2, and the second capacitor C2 is connected between the second node N2 and the first voltage line VL1. The first capacitor C1 includes a first electrode electrically connected to the first node N1 and a second electrode electrically connected to the second node N2. The second capacitor C2 includes a first electrode electrically connected to the first voltage line VL1 and a second electrode electrically connected to the second node N2.

The third transistor T3 is connected between the second electrode of the first transistor T1 and the third electrode of the first transistor T1. In detail, the third transistor T3 includes a first electrode electrically connected to the second electrode of the first transistor T1, a second electrode electrically connected to the first node N1, and a third electrode for receiving the j-th compensation scan signal GCj through the j-th compensation scan line GCLj. During a compensation period, the third transistor T3 is turned on in response to the j-th compensation scan signal GCj provided to the j-th compensation scan line GCLj. During the compensation period, the first transistor T1 may be diode-connected by the third transistor T3 turned on.

The fourth transistor T4 is electrically connected between the first node N1 and the initialization voltage line VIL1. In detail, the fourth transistor T4 includes a first electrode electrically connected to the first node N1, a second electrode electrically connected to the initialization voltage line VIL1, and a third electrode for receiving the j-th initialization scan signal GIj through the j-th initialization scan line GILj. The initialization voltage VINT may be applied to the initialization voltage line VIL1. During an initialization period, the fourth transistor T4 is turned on in response to the j-th initialization scan signal GIj provided to the j-th initialization scan line GILj. During the initialization period, the first node N1 may be initialized to the initialization voltage VINT by the fourth transistor T4 turned on.

The fifth transistor T5 may be electrically connected between the second node N2 and the first voltage line VL1. The fifth transistor T5 includes a first electrode connected to the first voltage line VL1, a second electrode electrically connected to the second node N2, and a third electrode for receiving the j-th compensation scan signal GCj through the j-th compensation scan line GCLj. During the compensation period, the fifth transistor T5 is turned on in response to the j-th compensation scan signal GCj provided to the j-th compensation scan line GCLj. The first voltage line VL1 and the second node N2 are electrically connected by the turned-on fifth transistor T5. That is, during the compensation period, the first driving voltage ELVDD may be applied to the second node N2.

In an embodiment of the disclosure, the third electrodes of the third and fifth transistors T3 and T5 are commonly connected to the j-th compensation scan line GCLj, but the disclosure is not limited thereto. That is, the third electrode of the third transistor T3 and the third electrode of the fifth transistor T5 are connected to different scan lines to receive different scan signals.

The sixth transistor T6 (or also referred to as an "emission control transistor") is connected between the second electrode of the first transistor T1 and the anode of the light-emitting element ED. In detail, the sixth transistor T6 includes a first electrode connected to the second electrode of the first transistor T1, a second electrode electrically connected to the anode of the light-emitting element ED, and a third electrode electrically connected to the j-th emission control line EMLj. During an emission period, the sixth transistor T6 may be turned on in response to the j-th emission control signal EMj provided to the j-th emission control line EMLj.

The seventh transistor T7 (or also referred to as an "anode initialization transistor") is connected between the anode initialization voltage line VIL2 and the anode of the light-emitting element ED. The seventh transistor T7 includes a first electrode connected to the anode of the light-emitting element ED, a second electrode connected to the anode initialization voltage line VIL2, and a third electrode that receives the j-th black scan signal GBj through the j-th black scan line GBLj. The anode initialization voltage AINT may be applied to the anode initialization voltage line VIL2. In an embodiment of the disclosure, the anode initialization voltage AINT has a different voltage level from the voltage level of the initialization voltage VINT. During a black period, the seventh transistor T7 is turned on in response to the j-th black scan signal GBj provided through the j-th black scan line GBLj. During the black period, the anode of the light-emitting element ED may be initialized to the anode initialization voltage AINT by the seventh transistor T7 thus turned on. In an alternative embodiment, the third electrode of the seventh transistor T7 may be connected to a (j+1)-th write scan line to receive a (j+1)-th write scan signal as the j-th black scan signal GBj.

The light-emitting element ED may be electrically connected between the sixth transistor T6 and the second voltage line VL2. The anode of the light-emitting element ED is connected to the second electrode of the sixth transistor T6, and a cathode of the light-emitting element ED is connected to the second voltage line VL2. The second driving voltage ELVSS may be applied to the second voltage line VL2. The second driving voltage ELVSS has a lower voltage level than that of the first driving voltage ELVDD. Accordingly, the light-emitting element ED may emit light in response to a voltage corresponding to a difference between the signal transmitted through the sixth transistor T6 and the second driving voltage ELVSS.

Referring to FIG. 2B, in a pixel PXij_a according to the disclosure, a fifth transistor T5*a* may be electrically connected between the second node N2 and a reference voltage line VRL. The reference voltage line VRL may receive the reference voltage Vref from the voltage generator 400 shown in FIG. 1 to supply the reference voltage Vref to the pixel PXij_a. The reference voltage Vref may have a lower voltage level than that of the first driving voltage ELVDD. The fifth transistor T5*a* includes a first electrode connected to the reference voltage line VRL, a second electrode electrically connected to the second node N2, and a third electrode receiving the j-th compensation scan signal GCj through the j-th compensation scan line GCLj. During the compensation period, the fifth transistor T5*a* is turned on in response to the j-th compensation scan signal GCj provided to the j-th compensation scan line GCLj. The reference voltage line VRL and the second node N2 are electrically connected by the turned-on fifth transistor T5*a*. That is, the reference voltage Vref may be applied to the second node N2 during the compensation period.

Figure 2C:
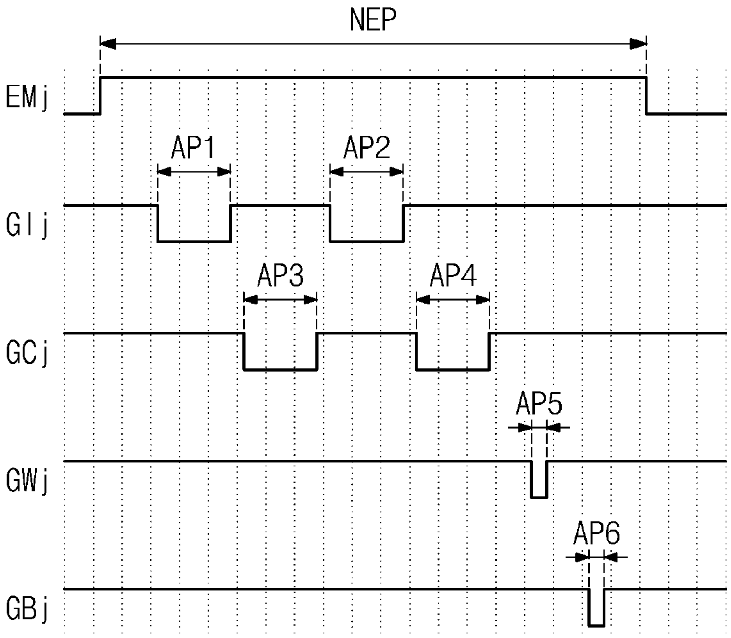
FIG. 2C is a timing diagram for describing an embodiment of an operation of a pixel, according to the disclosure.

FIG. 2C is a timing diagram for describing an embodiment of an operation of a pixel, according to the disclosure.

FIG. 2C shows only the j-th scan signals GIj, GCj, GWj, and GBj and the j-th emission control signal EMj. However, the other scan signals and the other emission control signals operate in the similar manner, and thus a detailed description thereof will be omitted to avoid redundancy.

Referring to FIGS. 2A and 2C, during a non-emission period NEP, the j-th initialization scan signal GIj among the j-th scan signals GIj, GCj, GWj, and GBj may be generated to have first and second active periods AP1 and AP2 (i.e., a low-level period). The non-emission period NEP may be defined as an inactive period (i.e., a high-level period) of the j-th emission control signal EMj.

The j-th initialization scan signal GIj is supplied to the fourth transistor T4 through the j-th initialization scan line GILj, and the fourth transistor T4 is turned on during the first and second active periods AP1 and AP2 in each of which the j-th initialization scan signal GIj is activated. During the first and second active periods AP1 and AP2, the potential of the first node N1 may be initialized to the initialization voltage VINT by the fourth transistor T4 turned on. That is, the j-th initialization scan signal GIj includes the two active periods AP1 and AP2, and thus the first node N1 may be initialized twice within the non-emission period NEP.

During the non-emission period NEP, the j-th compensation scan signal GCj among the j-th scan signals GIj, GCj, GWj, and GBj may be generated to have third and fourth active periods AP3 and AP4.

When the j-th compensation scan signal GCj is supplied to the third and fifth transistors T3 and T5 through the j-th compensation scan line GCLj, the third and fifth transistors T3 and T5 are turned on in the third and fourth active periods AP3 and AP4. The first transistor T1 is diode-connected by the third transistor T3 turned on and is forward-biased. Then, a compensation voltage ("ELVDD-Vth") obtained by reducing the first driving voltage ELVDD by a threshold voltage Vth of the first transistor T1 may be applied to the first node N1. That is, in the third and fourth active periods AP3 and AP4, the potential of the first node N1 may be compensated to be the compensation voltage ("ELVDD-Vth"). During the third and fourth active periods AP3 and AP4, the first driving voltage ELVDD is applied to the second node N2 through the turned-on fifth transistor T5.

The duration of each of the third and fourth active periods AP3 and AP4 may be the same as the duration of each of the first and second active periods AP1 and AP2.

Among the j-th scan signals GIj, GCj, GWj, and GBj, the j-th write scan signal GWj may be generated to have a fifth active period AP5 during the non-emission period NEP, and the j-th black scan signal GBj may be generated to have a sixth active period AP6 during the non-emission period NEP.

The j-th write scan signal GWj is supplied to the second transistor T2 through the j-th write scan line GWLj, and then the second transistor T2 is turned on during a fifth active period AP5. The data voltage Vdata may be applied to the second node N2 through the turned-on second transistor T2. Then, the potential of the second node N2 changes from the first driving voltage ELVDD to the i-th data voltage Vdata. The potential of the first node N1 is also changed by the coupling of the first capacitor C1.

The j-th black scan signal GBj is supplied to the seventh transistor T7 through the j-th black scan line GBLj, and then the seventh transistor T7 is turned on during the sixth active period AP6. During the sixth active period AP6, the anode initialization voltage AINT may be applied to the anode of the light-emitting element ED through the turned-on seventh transistor T7. Then, the anode of the light-emitting element ED may be initialized to the anode initialization voltage AINT.

In an embodiment of the disclosure, the fifth active period AP5 and the sixth active period AP6 may have the same duration as each other. Besides, the duration of each of the first to fourth active periods AP1 to AP4 may be greater than or equal to the duration of each of the fifth and sixth active periods AP5 and AP6. FIG. 2C illustrate that the duration of each of the first to fourth active periods AP1 to AP4 is three times greater than the duration of each of the fifth and sixth active periods AP5 and AP6, but the disclosure is not limited to thereto. In an alternative embodiment, the duration of each of the first to fourth active periods AP1 to AP4 may be twice or four times greater than the duration of each of the fifth and sixth active periods AP5 and AP6.

Figure 3A:
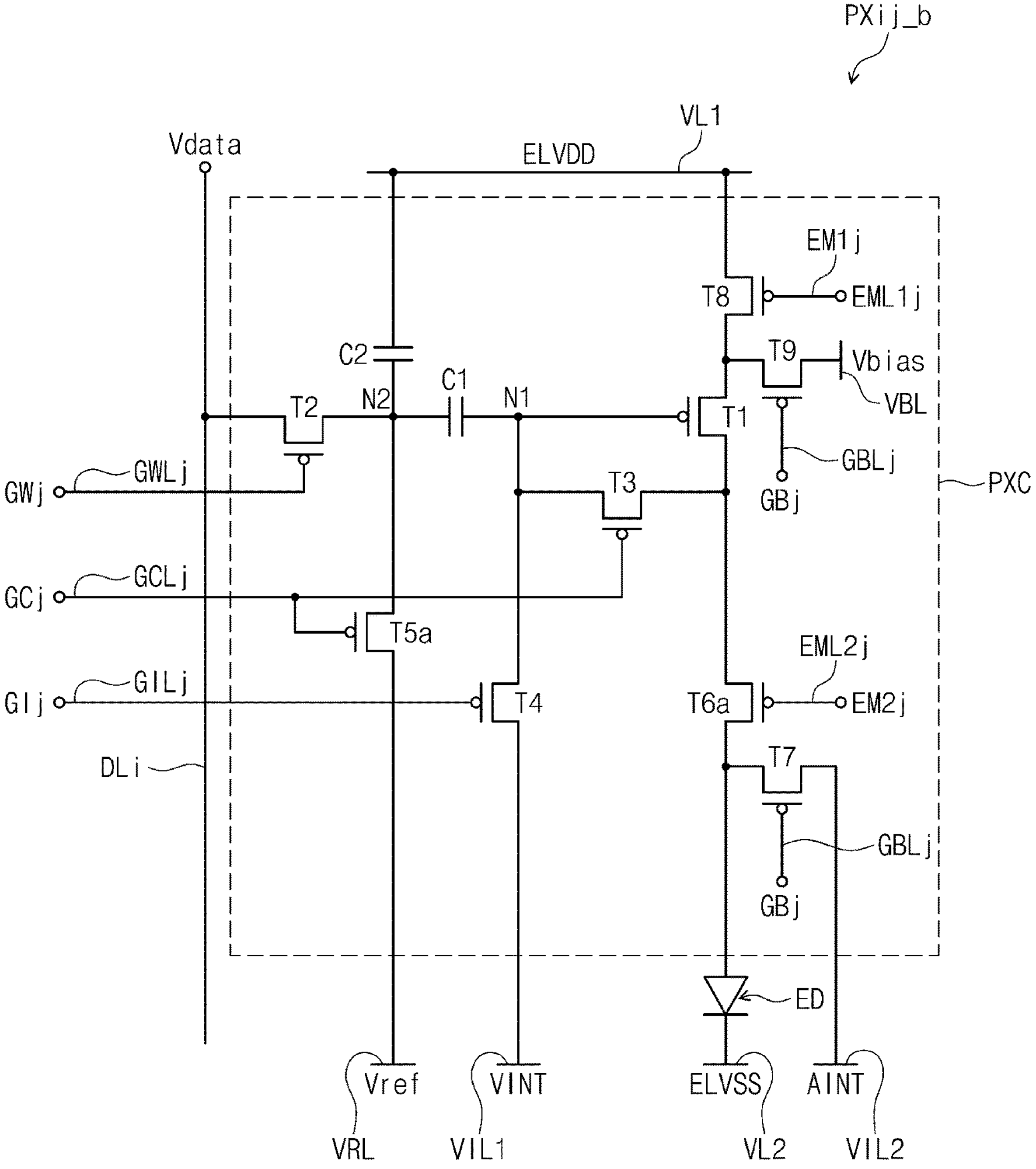
FIG. 3A is a circuit diagram of an embodiment of a pixel, according to the disclosure.
Figure 3B:
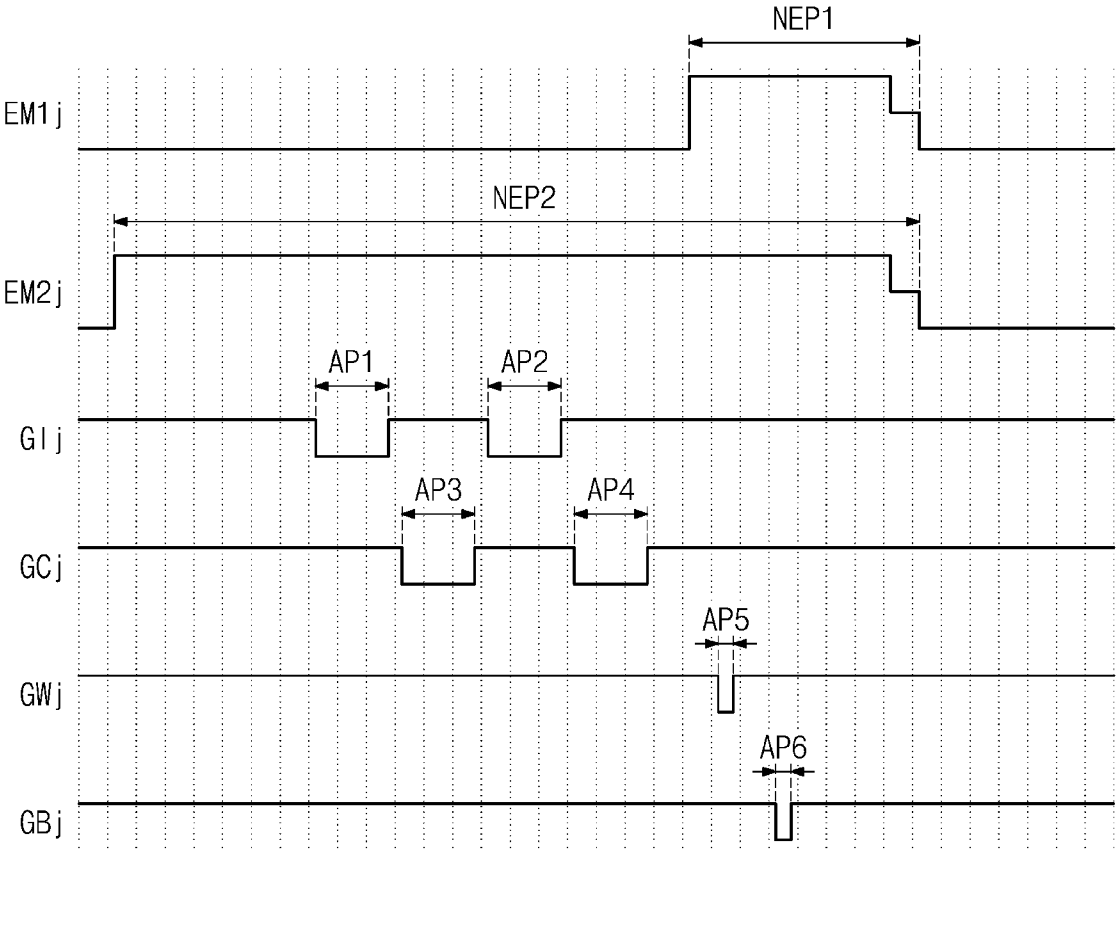
FIG. 3B is a timing diagram for describing an embodiment of an operation of a pixel, according to the disclosure.

FIG. 3A is a circuit diagram of an embodiment of a pixel, according to the disclosure. FIG. 3B is a timing diagram for describing an embodiment of an operation of a pixel, according to the disclosure. However, the same reference numerals are given to the same components as those shown in FIGS. 2A and 2B among the components shown in FIGS. 3A and 3B, and thus a detailed description thereof will be omitted to avoid redundancy.

Referring to FIG. 3A, the pixel PXij_b in an embodiment of the disclosure includes the pixel circuit unit PXC and the light-emitting element ED. In an embodiment of the disclosure, the pixel circuit unit PXC may include nine transistors and two capacitors. Hereinafter, the nine transistors are respectively referred to as "first to ninth transistors T1, T2, T3, T4, T5*a*, T6*a*, T7, T8, and T9. The two capacitors are referred to as "first and second capacitors C1 and C2".

In an embodiment of the disclosure, the pixel PXij_b may be connected to the first voltage line VL1, the second voltage line VL2, the initialization voltage line VIL1, the anode initialization voltage line VIL2, the reference voltage line VRL, and a bias voltage line VBL. The bias voltage line VBL receives a bias voltage Vbias from the voltage generator 400 (refer to FIG. 1) and transmits the bias voltage Vbias to the pixel PXij_b.

The eighth transistor T8 may be electrically connected between the first transistor T1 and the first voltage line VL1. In detail, the eighth transistor T8 includes a first electrode electrically connected to the first voltage line VL1, a second electrode electrically connected to the first electrode of the first transistor T1, and a third electrode for receiving a j-th first emission control signal EM1*j* through a j-th first emission control line EML1*j*. During a first emission period, the eighth transistor T8 may be turned on in response to the j-th first emission control signal EM1*j* provided through the j-th first emission control line EML1*j*.

The ninth transistor T9 may be electrically connected between the first transistor T1 and the bias voltage line VBL. In detail, the ninth transistor T9 includes a first electrode electrically connected to the bias voltage line VBL, a second electrode electrically connected to the first electrode of the first transistor T1, and a third electrode for receiving the j-th black scan signal GBj through the j-th black scan line GBLj. During a black period, the ninth transistor T9 is turned on in response to the j-th black scan signal GBj provided through the j-th black scan line GBLj. During the black period, the bias voltage Vbias may be applied to the first electrode of the first transistor T1 through the turned-on ninth transistor T9.

The sixth transistor T6*a* is connected between the second electrode of the first transistor T1 and the anode of the light-emitting element ED. In detail, the sixth transistor T6*a* includes a first electrode connected to the second electrode of the first transistor T1, a second electrode electrically connected to the anode of the light-emitting element ED, and a third electrode electrically connected to a j-th second emission control line EML2*j*. During a second emission period, the sixth transistor T6*a* may be turned on in response to a j-th second emission control signal EM2*j* provided through the j-th second emission control line EML2*j*.

Referring to FIGS. 3A and 3B, the j-th first emission control signal EM1*j* includes a first non-emission period NEP1. The j-th second emission control signal EM2*j* includes a second non-emission period NEP2. In an embodiment of the disclosure, the first and second non-emission periods NEP1 and NEP2 may overlap each other. The duration of the second non-emission period NEP2 may be greater than the duration of the first non-emission period NEP1. The first non-emission period NEP1 may be defined as an inactive period (i.e., a high-level period) of the j-th first emission control signal EM1*j*. The second non-emission period NEP2 may be defined as an inactive period (i.e., a high-level period) of the j-th second emission control signal EM2*j*.

During the second non-emission period NEP2, the j-th initialization scan signal GIj may be generated to have the first and second active periods AP1 and AP2 (i.e., low-level periods). During the second non-emission period NEP2, the j-th compensation scan signal GCj may be generated to have the third and fourth active periods AP3 and AP4 (i.e., low-level periods).

During the second non-emission period NEP2, the j-th write scan signal GWj may be generated to have the fifth active period AP5. During the second non-emission period NEP2, the j-th black scan signal GBj may be generated to have the sixth active period AP6. The fifth and sixth active periods AP5 and AP6 may overlap the first non-emission period NEP1.

Figure 4A:
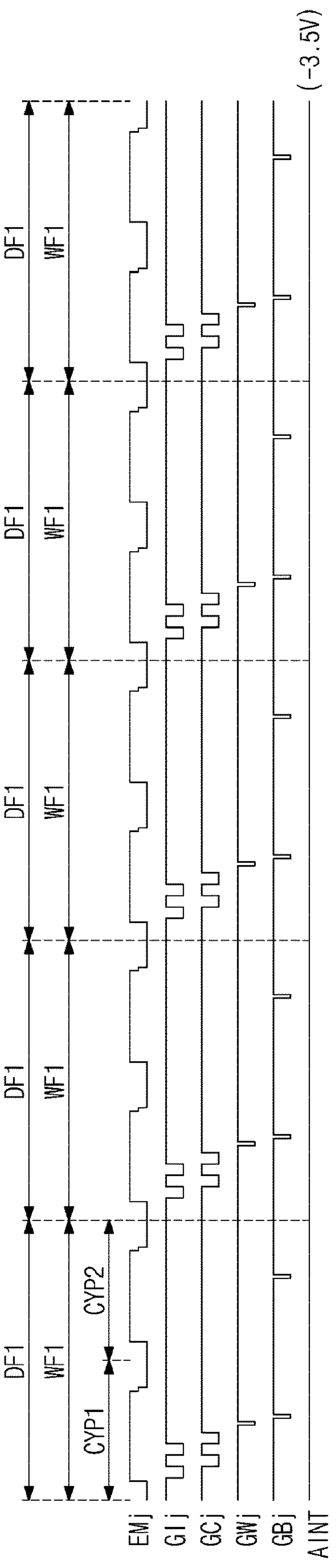
FIG. 4A is a timing diagram for describing an embodiment of a display device operating at a first operating frequency in a variable frequency mode, according to the disclosure.
Figure 4B:
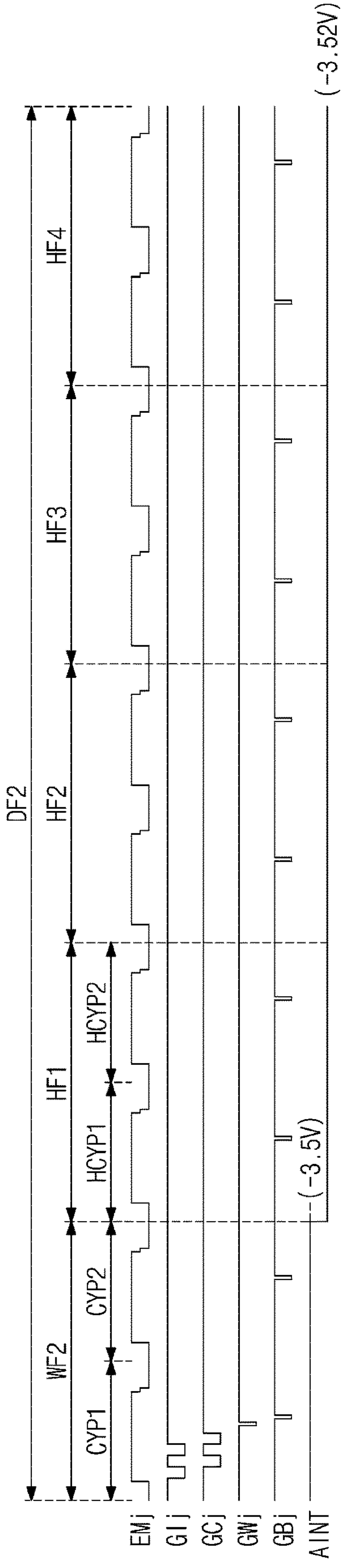
FIGS. 4B to 4D are timing diagrams for describing an embodiment of a display device operating at a second operating frequency in a variable frequency mode and variation of an anode initialization voltage, according to the disclosure.
Figure 4C:
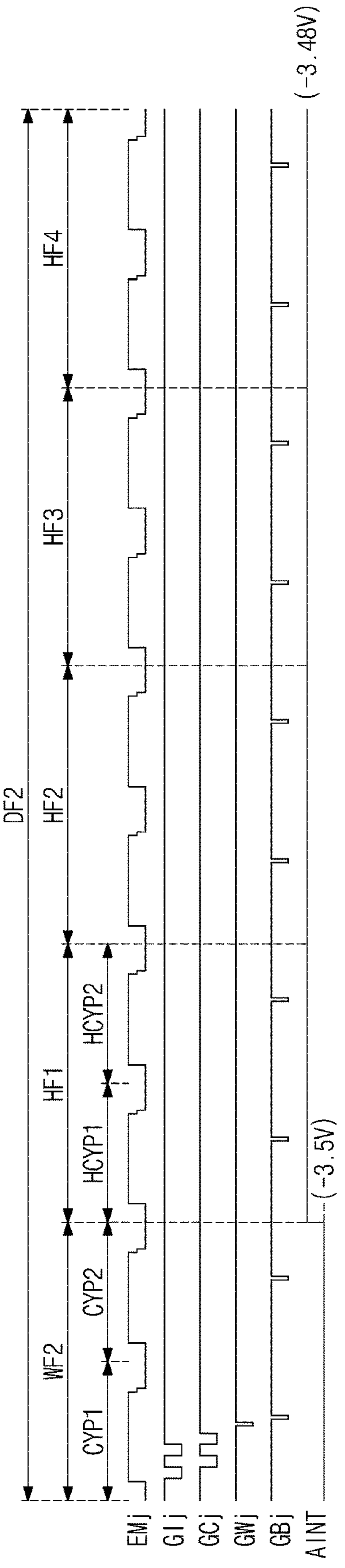
Figure 4D:
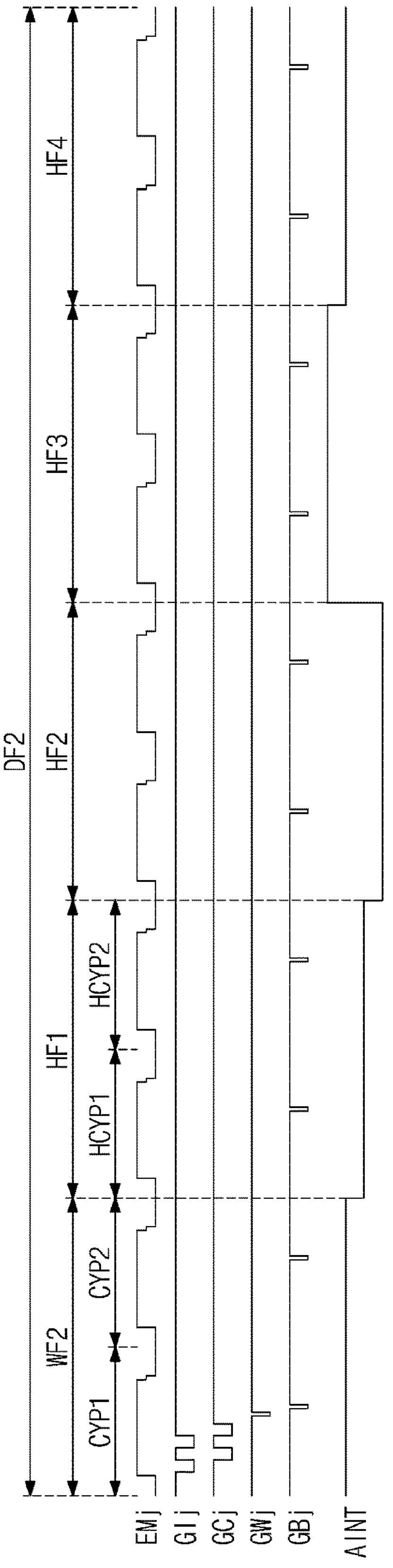

FIG. 4A is a timing diagram for describing an embodiment of a display device operating at a first operating frequency in a variable frequency mode, according to the disclosure. FIGS. 4B to 4D are timing diagrams for describing an embodiment of a display device operating at a second operating frequency in a variable frequency mode and variation of an anode initialization voltage, according to the disclosure.

Referring to FIGS. 1 and 4A, the display device DD may operate in a normal frequency mode (or a first mode) in which an operating frequency is fixed (i.e., not variable) or in a variable frequency mode (or a second mode) in which the operating frequency is variable. In the variable frequency mode, the operating frequency may be varied according to a frame rate. FIG. 4A shows that the display device DD operates at a first operating frequency in the variable frequency mode. FIG. 4B shows that the display device DD operates at a second operating frequency in the variable frequency mode. In an embodiment of the disclosure, the first operating frequency may be the highest operating frequency at which the display device DD is capable of operating. In an embodiment, the first operating frequency may be about 240 hertz (Hz) or about 480 Hz, for example. The first operating frequency may be also referred to as a "reference frequency" or "maximum frequency". The second operating frequency may be lower than the first operating frequency. In an embodiment of the disclosure, the second operating frequency may be a frequency corresponding to one of predetermined compensation frequencies in the panel driver PDD (e.g. the driving controller 100).

As shown in FIGS. 1 and 4A, when the display device DD operates at the first operating frequency in the variable frequency mode, the scan signals GIj, GCj, GWj, and GBj and the emission control signal EMj may be activated within a first driving frame DF1. In an embodiment of the disclosure, an active period in which the scan signals GIj, GCj, GWj, and GBj and the emission control signal EMj are activated may be defined as a low-level period. An inactive period in which the scan signals GIj, GCj, GWj, and GBj and the emission control signal EMj are deactivated may be defined as a high-level period. In an embodiment of the disclosure, the first driving frame DF1 may include a first write frame WF1. The first write frame WF1 may include a first cycle period CYP1 and a second cycle period CYP2.

Some scan signals GIj, GCj, and GWj of the scan signals GIj, GCj, GWj, and GBj are activated within only the first cycle period CYP1, and may remain in an inactive state within the second cycle period CYP2. The black scan signal GBj and the emission control signal EMj may be activated within the first and second cycle periods CYP1 and CYP2. The initialization scan signal GIj, the compensation scan signal GCj, and the write scan signal GWj may be activated within only the first cycle period CYP1. That is, the black scan signal GBj and the emission control signal EMj are activated in units of one cycle period. The initialization, compensation, and write scan signals GIj, GCj, and GWj are activated in units of one write frame. Accordingly, frequencies of the black scan signal GBj and the emission control signal EMj may be greater than frequencies of the initialization, compensation, and write scan signals GIj, GCj, and GWj.

As shown in FIGS. 1 and 4B, in the variable frequency mode, the display device DD may operate at the second operating frequency different from the first operating frequency. In an embodiment of the disclosure, the second operating frequency may be lower than the first operating frequency. In an embodiment, the second operating frequency may be about 48 Hz or about 96 Hz, for example. When the display device DD operates at the second operating frequency, the scan signals GIj, GCj, GWj, and GBj and the emission control signals EMj may be activated within a second driving frame DF2.

In an embodiment of the disclosure, the second driving frame DF2 may include a second write frame WF2 and a plurality of holding frames HF1, HF2, HF3, and HF4. The duration of the second write frame WF2 may be the same as the duration of the first write frame WF1. The duration of each of the plurality of holding frames HF1, HF2, HF3, and HF4 may be the same as the duration of the second write frame WF2. The number of holding frames HF1, HF2, HF3, and HF4 included in the second driving frame DF2 may vary depending on the second operating frequency.

Some scan signals GIj, GCj, and GWj of the scan signals GIj, GCj, GWj, and GBj may be activated within only the second write frame WF2 and may maintain an inactive state within the holding frames HF1, HF2, HF3, and HF4. The second write frame WF2 may include the first cycle period CYP1 and the second cycle period CYP2. Each of the holding frames HF1, HF2, HF3, and HF4 may include a first holding cycle period HCYP1 and a second holding cycle period HCYP2. In an embodiment of the disclosure, each of the first and second holding cycle periods HCYP1 and HCYP2 may have the same duration as each of the first and second cycle periods CYP1 and CYP2.

Some scan signals GIj, GCj, and GWj among the scan signals GIj, GCj, GWj, and GBj may be activated within only the first cycle period CYP1 of the second write frame WF2 and may remain in an inactive state within the second cycle period CYP2. The black scan signal GBj and the emission control signal EMj may be activated within the second write frame WF2 and the holding frames HF1, HF2, HF3, and HF4. That is, the black scan signal GBj and the emission control signal EMj are activated in units of one cycle period. The frequencies of the black scan signal GBj and the emission control signal EMj are activated in units of one write frame. Accordingly, frequencies of the black scan signal GBj and the emission control signal EMj may be greater than frequencies of the initialization, compensation, and write scan signals GIj, GCj, and GWj.

In an embodiment of the disclosure, the anode initialization voltage AINT may be maintained at a constant level during the first driving frame DF1 operating at the first operating frequency. In the meantime, the anode initialization voltage AINT may be varied at a predetermined time point during the second driving frame DF2 operating at the second operating frequency.

In an embodiment of the disclosure, the driving controller 100 may determine whether the second operating frequency corresponds to one of predetermined compensation frequencies, and may output a voltage control signal VCS (refer to FIG. 1) depending on the determination result. The voltage generator 400 may change a voltage level of the anode initialization voltage AINT in response to the voltage control signal VCS.

In an embodiment of the disclosure, the voltage level of the anode initialization voltage AINT may be down at the start time of each of the holding frames HF1, HF2, HF3, and HF4 of the second driving frame DF2. In an embodiment, during the first write frame WF1 of the first driving frame DF1 or the second write frame WF2 of the second driving frame DF2, the anode initialization voltage AINT may be maintained at a first voltage level (e.g., about −3.5 volts (V)), for example. However, from the start time of the holding frames HF1, HF2, HF3, and HF4 (in particular, the first holding frame HF1), the anode initialization voltage AINT may be down from the first voltage level to a second voltage level (e.g., about −3.52 V).

FIG. 4B shows that the anode initialization voltage AINT is changed within the first holding frame HF1. However, the disclosure may not be limited thereto. In an embodiment, the anode initialization voltage AINT may be changed at the start time of the second or third holding frame HF2 or HF3 among the holding frames HF1, HF2, HF3, and HF4, for example.

FIG. 4B shows that the anode initialization voltage AINT is down from the first voltage level to the second voltage level at the start time of the first holding frame HF1. However, the disclosure is not limited thereto. As shown in FIG. 4C, at the start time of the first holding frame HF1, the anode initialization voltage AINT may increase from the first voltage level to a third voltage level. The third voltage level may be a higher voltage level than the first voltage level. In an embodiment, when the first voltage level is about −3.5 V, the third voltage level may be about −3.48 V, for example.

In an alternative embodiment, the anode initialization voltage AINT may be varied in units of at least one holding frame. FIG. 4D shows that the anode initialization voltage AINT is varied in units of one holding frame, but is not limited thereto. In an embodiment, the anode initialization voltage AINT may be varied in units of two holding frames or in units of at least one holding cycle period, for example. FIG. 4D shows that the anode initialization voltage AINT is randomly varied in units of one holding frame, but the disclosure is not limited thereto. In an embodiment, during the holding frames HF1, HF2, HF3, and HF4, the anode initialization voltage AINT may be gradually (or stepwise) varied (increased or decreased), for example.

Figure 5:
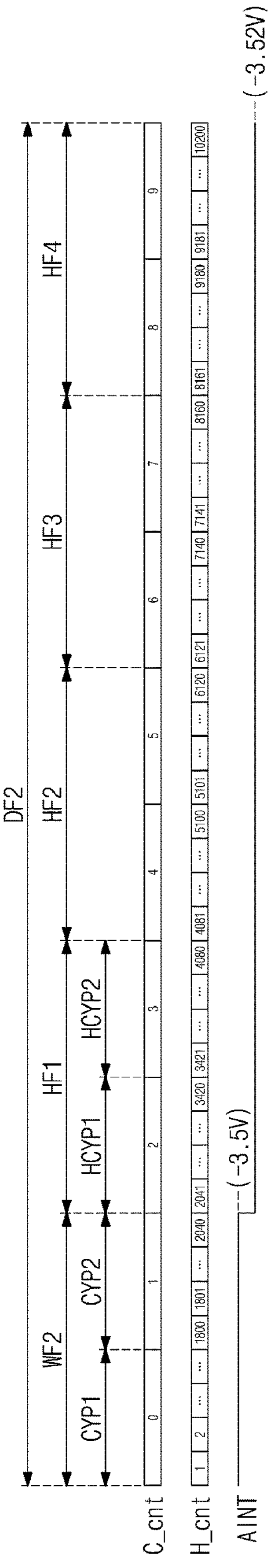
FIG. 5 is a diagram for describing an embodiment of the variable timing of an anode initialization voltage during an operation at a second operating frequency, according to the disclosure.

FIG. 5 is a diagram for describing an embodiment of the variable timing of an anode initialization voltage during an operation at a second operating frequency, according to the disclosure.

Referring to FIGS. 1 and 5, the driving controller 100 may count a horizontal synchronization signal by a predetermined clock signal. In particular, the driving controller 100 may generate a first counting signal H_cnt by counting the horizontal synchronization signal from the start time of the second driving frame DF2. The counting value of the first counting signal H_cnt may increase by 1 at each period of the horizontal synchronization signal. In an embodiment of the disclosure, the driving controller 100 may generate a second counting signal C_cnt by counting a cycle synchronization signal from the start time of the second driving frame DF2. The counting value of the second counting signal C_cnt may increase by 1 at each period of the cycle simultaneous signal. In an embodiment, when the first cycle period CYP1 is activated after the second driving frame DF2 is initiated, the second counting signal C_cnt may have a counting value corresponding to "0", for example. Afterward, when the second cycle period CYP2 is activated, the second counting signal C_cnt has a counting value corresponding to "1". Afterward, when the first holding cycle period HCYP1 is activated, the second counting signal C_cnt has a counting value corresponding to "2".

In the meantime, during the second write frame WF2 after the second driving frame DF2 is initiated, a horizontal synchronization signal is activated periodically. At the end of the write frame WF2, the first counting signal H_cnt counting the horizontal synchronization signal may have a counting value corresponding to "2040". Afterward, when the first holding frame HF1 is initiated, the first counting signal H_cnt may have a counting value corresponding to "2041". In an embodiment of the disclosure, the start time of the first holding frame HF1 may be a time point when the counting value has a predetermined reference value (e.g., a value corresponding to "2041"). The driving controller 100 may vary the anode initialization voltage AINT at the start time of the first holding frame HF1.

In FIG. 5, for convenience of description, a counting value is expressed as a decimal number. However, an actual counting value may be a value obtained by converting a decimal number to a binary number having 'k' bits ('k' is an integer greater than 1).

FIG. 5 shows that the anode initialization voltage AINT is changed within the first holding frame HF1. However, the disclosure may not be limited thereto. In an embodiment, when the reference value is set as "4081", the anode initialization voltage AINT may be changed at the start time of the second holding frame HF2, for example.

In addition, FIGS. 4B and 5 show that the anode initialization voltage AINT is reduced by about 20 millivolts (mV), but the variable amount of the anode initialization voltage AINT is not limited thereto. The variable amount of the anode initialization voltage AINT may be greater or less than about 20 mV.

Figure 6A:
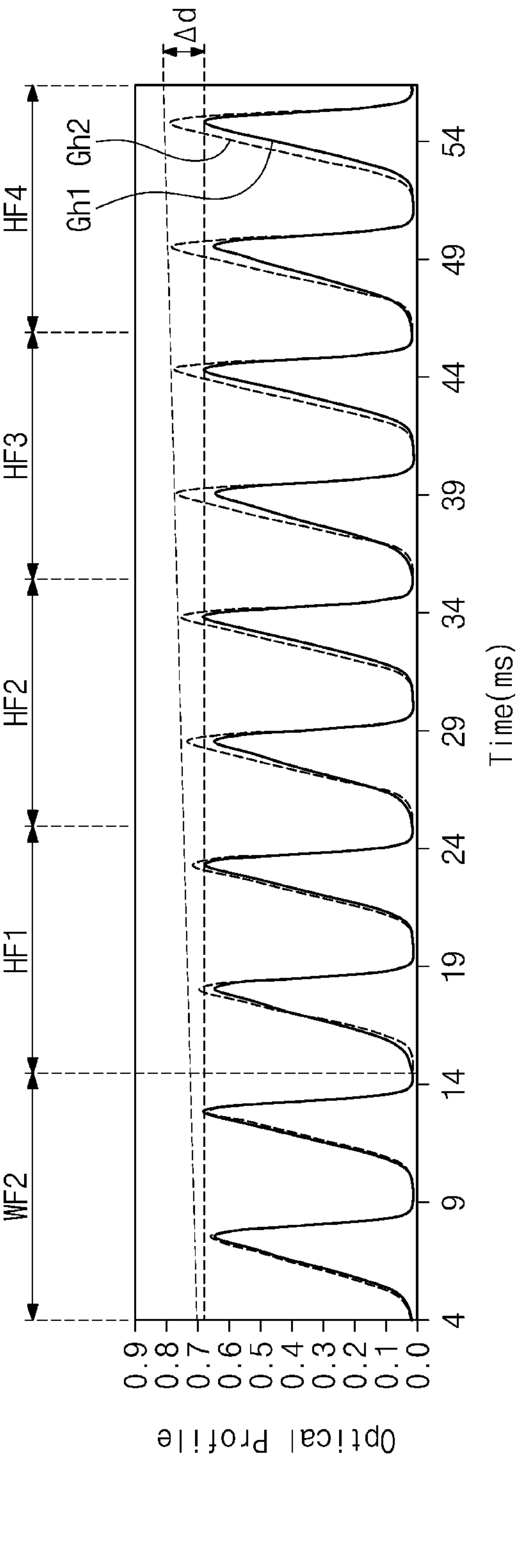
FIG. 6A is a waveform diagram illustrating an optical profile at a relatively low grayscale when an anode initialization voltage is not varied.
Figure 6B:
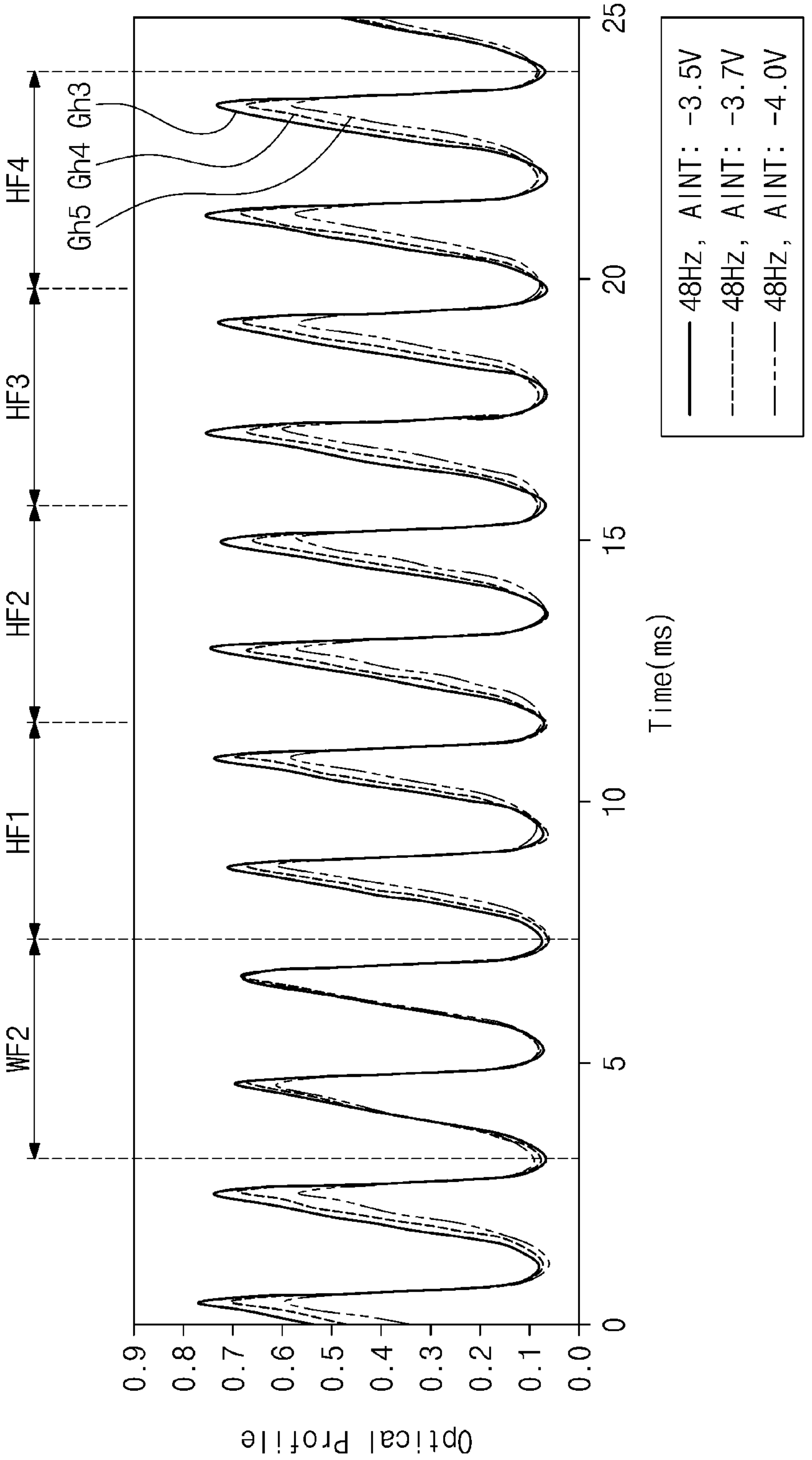
FIG. 6B is a waveform diagram showing an embodiment of an optical profile at a relatively low grayscale depending on a voltage level of an anode initialization voltage during an operation at a second operating frequency, according to the disclosure.

FIG. 6A is a waveform diagram illustrating an optical profile at a relatively low grayscale when an anode initialization voltage is not varied. FIG. 6B is a waveform diagram showing an embodiment of an optical profile at a relatively low grayscale depending on a voltage level of an anode initialization voltage during an operation at a second operating frequency, according to the disclosure.

In FIG. 6A, a first graph Gh1 indicates a first optical profile measured at a predetermined grayscale (e.g., 11 grayscale) during an operation at a relatively high frequency (e.g., about 240 Hz) in a variable frequency mode. In FIG. 6A, a second graph Gh2 indicates a second optical profile measured at a predetermined grayscale during an operation at a relatively low frequency (e.g., about 48 Hz) in the variable frequency mode. In particular, in FIG. 6A, the second graph Gh2 indicates an optical profile measured in a state where a voltage level of the anode initialization voltage AINT is not changed even after the holding frames HF1 to HF4 are entered. It is indicated that the second optical profile gradually increases when the anode initialization voltage AINT constantly remains at the same voltage level (e.g., about −3.5 V) in high-frequency driving and low-frequency driving. That is, it is indicated that a difference Δd between the first and second optical profiles increases as time elapses.

In the meantime, in FIG. 6B, each of third to fifth graphs Gh3, Gh4, and Gh5 indicates an optical profile measured at a predetermined grayscale (e.g., 11 grayscale) during an operation at a relatively low frequency (e.g., about 48 Hz) in the variable frequency mode. In particular, in FIG. 6B, the third graph Gh3 indicates a third optical profile measured in a state where the voltage level of the anode initialization voltage AINT is maintained at about −3.5 V. The fourth graph Gh4 indicates a fourth optical profile measured in a state where the voltage level of the anode initialization voltage AINT is changed from the start time of the first holding frame HF1 to about −3.7 V. The fifth graph Gh5 indicates a fifth optical profile measured in a state where the voltage level of the anode initialization voltage AINT is changed from the start time of the first holding frame HF1 to about −4.0 V.

The fourth optical profile was measured to be lower than the third optical profile, and the fifth optical profile has been measured to be lower than the fourth optical profile. That is, as the anode initialization voltage AINT decreases, the light-emitting delay effect of the light-emitting element ED (refer to FIG. 2A) occurs, and thus an optical profile appears to decrease relatively. Accordingly, when the anode initialization voltage AINT is reduced to about −3.5 V, the difference Δd from the first optical profile may be reduced.

Figure 7:
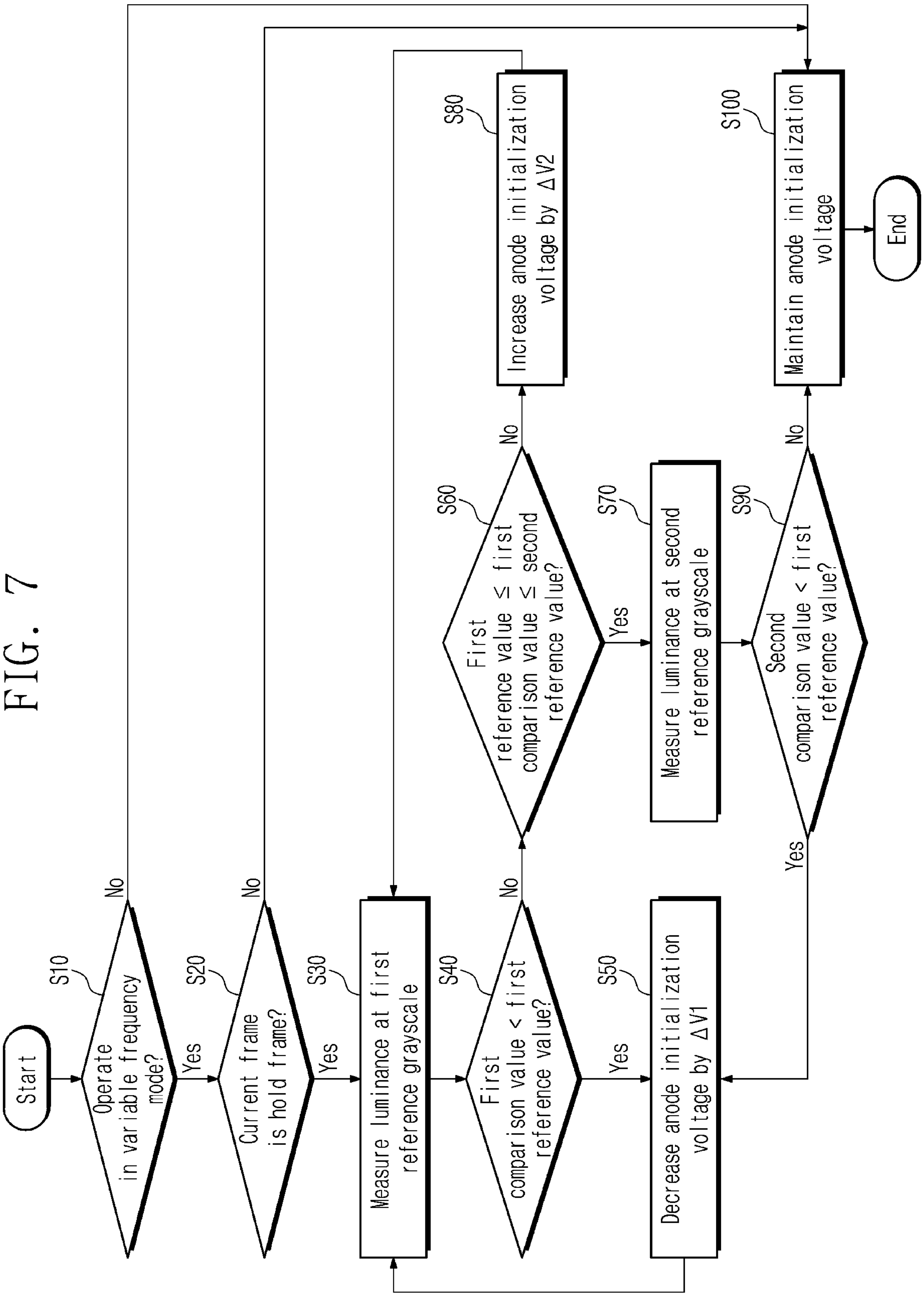
FIG. 7 is a flowchart illustrating an embodiment of a process of setting an anode initialization voltage of a display device, according to the disclosure.
Figure 8:
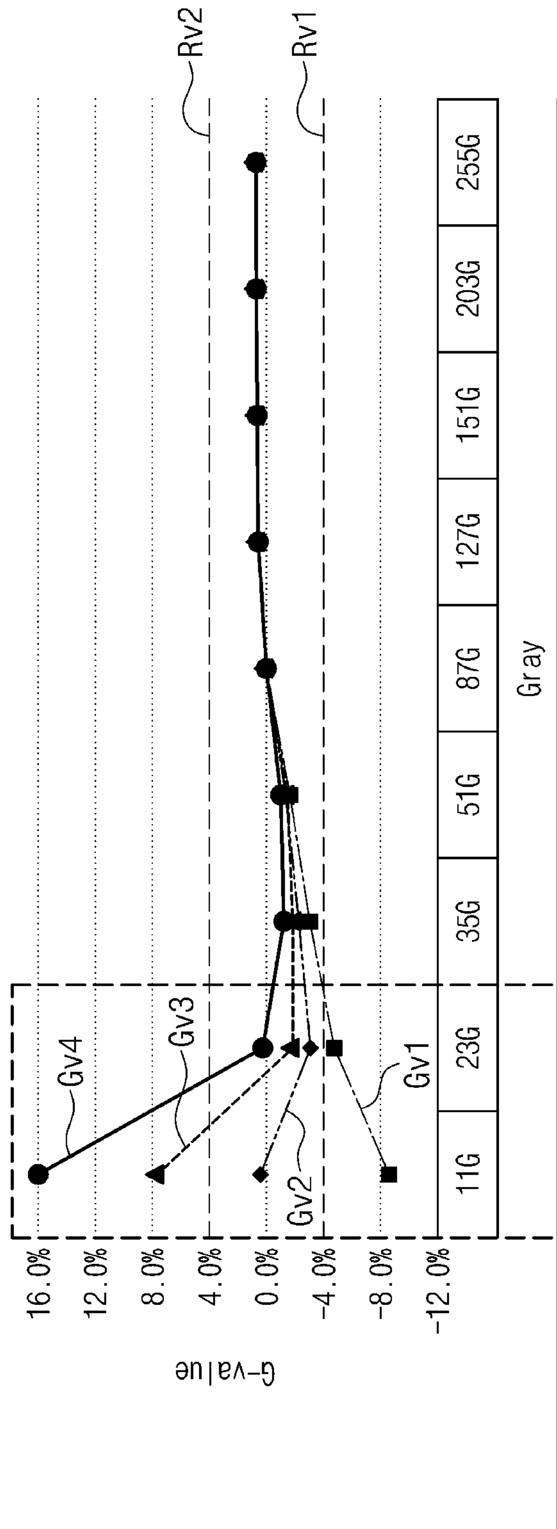
FIG. 8 is a graph showing an embodiment of comparison values according to voltage levels of an anode initialization voltage of a display device, according to the disclosure.

FIG. 7 is a flowchart illustrating an embodiment of a process of setting an anode initialization voltage of a display device, according to the disclosure. FIG. 8 is a graph showing an embodiment of comparison values according to voltage levels of an anode initialization voltage of a display device, according to the disclosure.

Referring to FIGS. 7 and 8, a test device in an embodiment of the disclosure may determine whether a display device to be tested (hereinafter is also referred to as a "target display device") operates in a variable frequency mode (S10). When the target display device does not operate in the variable frequency mode, the voltage level of the anode initialization voltage AINT may be maintained constant without being varied (S100).

In the meantime, when the target display device operates in the variable frequency mode, the test device may determine whether a current frame of the target display device is a write frame or a holding frame (S20). When the current frame is the holding frame, the test device may measure the luminance of the target display device at a first reference grayscale through a luminance measuring unit (S30). In an embodiment of the disclosure, the first reference grayscale may be one selected grayscale (e.g., 11 grayscale (11G)) among relatively low grayscales. The test device may calculate a first comparison value based on the measured luminance. The test device may determine whether the first comparison value is smaller than a predetermined first reference value Rv1 (S40). The first comparison value may be a value calculated based on luminance, which is measured when the target display device is driven at the maximum operating frequency, and luminance measured when the target display device is driven at an actual operating frequency. The predetermined first reference value Rv1 may be the lowest value in a predetermined reference range. In an embodiment of the disclosure, the predetermined first reference value Rv1 may be about −4%.

When the determination result indicates that the first comparison value is less than the predetermined first reference value Rv1, the test device may decrease the anode initialization voltage AINT of the target display device by a first change amount ΔV1 (S50). In an embodiment of the disclosure, the first change amount ΔV1 may be about 20 mV, but is not limited thereto.

In the meantime, when the first comparison value is greater than or equal to the predetermined first reference value Rv1, the test device may determine whether the first comparison value is less than or equal to a predetermined second reference value Rv2 (S60). The predetermined second reference value Rv2 may be the highest value in the predetermined reference range. In an embodiment of the disclosure, the predetermined second reference value Rv2 may be about 4%.

When the determination result indicates that the first comparison value is less than or equal to the predetermined second reference value Rv2, the test device may measure the luminance of the target display device at a second reference grayscale (e.g., 23 grayscale (23G)) through the luminance measuring unit (S70). In an embodiment of the disclosure, the second reference grayscale (23G) may be a higher grayscale (e.g., 23 grayscale) than the first reference grayscale (11G). The test device may calculate a second comparison value based on the measured luminance. When the determination result indicates that the second comparison value is greater than the predetermined second reference value Rv2, the test device may increase the anode initialization voltage AINT by a second change amount (S80). In an embodiment of the disclosure, a second change amount ΔV2 may be about 20 mV, but is not limited thereto.

The test device may determine whether the second comparison value is smaller than the predetermined first reference value Rv1 (S90). When the determination result indicates that the second comparison value is less than the predetermined first reference value Rv1, the test device may decrease the anode initialization voltage AINT of the target display device by the first change amount ΔV1 (S50). However, when the second comparison value is greater than or equal to the predetermined first reference value Rv1, the test device may maintain the anode initialization voltage AINT as it is (S100).

Referring to FIG. 8, during an operation at a relatively low frequency (e.g., about 48 Hz), a first graph Gv1 shows a comparison value (G-value (%)) measured for each grayscale when the anode initialization voltage AINT is about −3.5 V, and a second graph Gv2 shows the comparison value (G-value (%)) measured for each grayscale when the anode initialization voltage AINT is about −3.6 V. A third graph Gv3 shows a comparison value (G-value (%)) measured for each grayscale when the anode initialization voltage AINT is about −3.7 V, and a fourth graph Gv4 shows the measured comparison value (G-value (%)) for each grayscale when the anode initialization voltage AINT is about −3.8 V.

It is indicated that the comparison value increases to be the predetermined second reference value Rv2 or higher due to the increase in luminance at a relatively low grayscale when the anode initialization voltage AINT is maintained at about −3.5 V without being changed in the holding frame after the variable frequency mode is entered. However, it is indicated that the comparison value is disposed between the predetermined first reference value Rv1 and the predetermined second reference value Rv2 even at a relatively low grayscale when the anode initialization voltage AINT is down to about −3.6 V at the start time of the holding frame. In the meantime, it is indicated that the comparison value is down to the predetermined first reference value Rv1 or less when the anode initialization voltage AINT is changed to a predetermined voltage or less. Accordingly, the appropriate anode initialization voltage AINT may be set for each operating frequency by varying the anode initialization voltage AINT for each operating frequency in the variable frequency mode, measuring the comparison value, and determining whether the measured comparison value is disposed within a reference range between the first and second reference values Rv1 and Rv2. In an embodiment, during an operation at about 48 Hz, the anode initialization voltage AINT may be changed to a voltage level between approximately about −3.5 V and about −3.6 V, for example.

Figure 9:
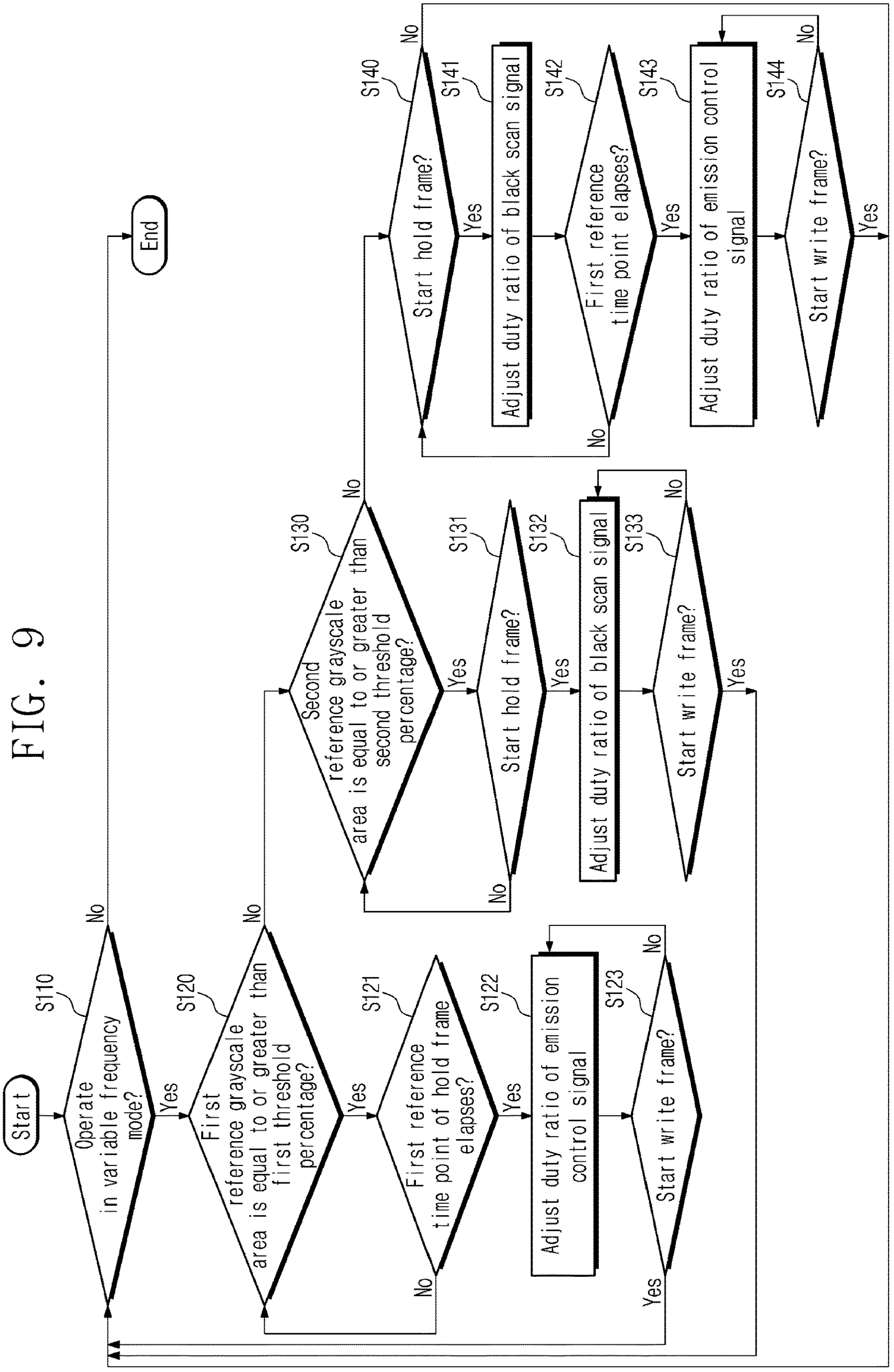
FIG. 9 is a flowchart illustrating an embodiment of an operation process of a display device, according to the disclosure.
Figure 10A:
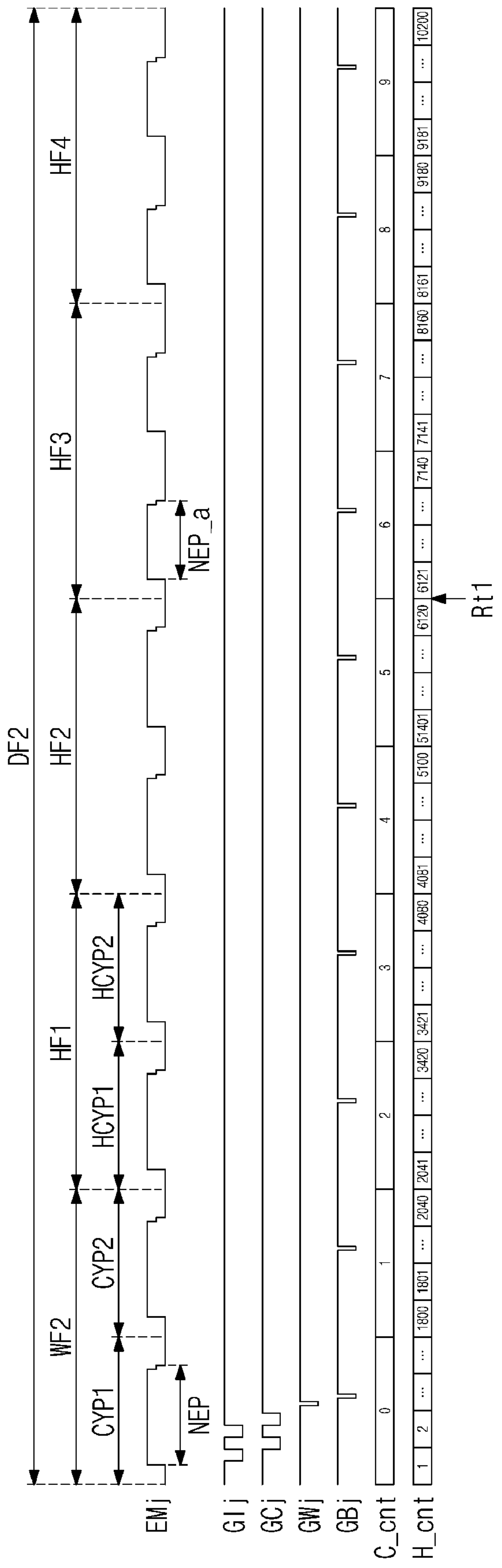
FIG. 10A is a timing diagram for describing a first compensation operation shown in FIG. 9.
Figure 10B:
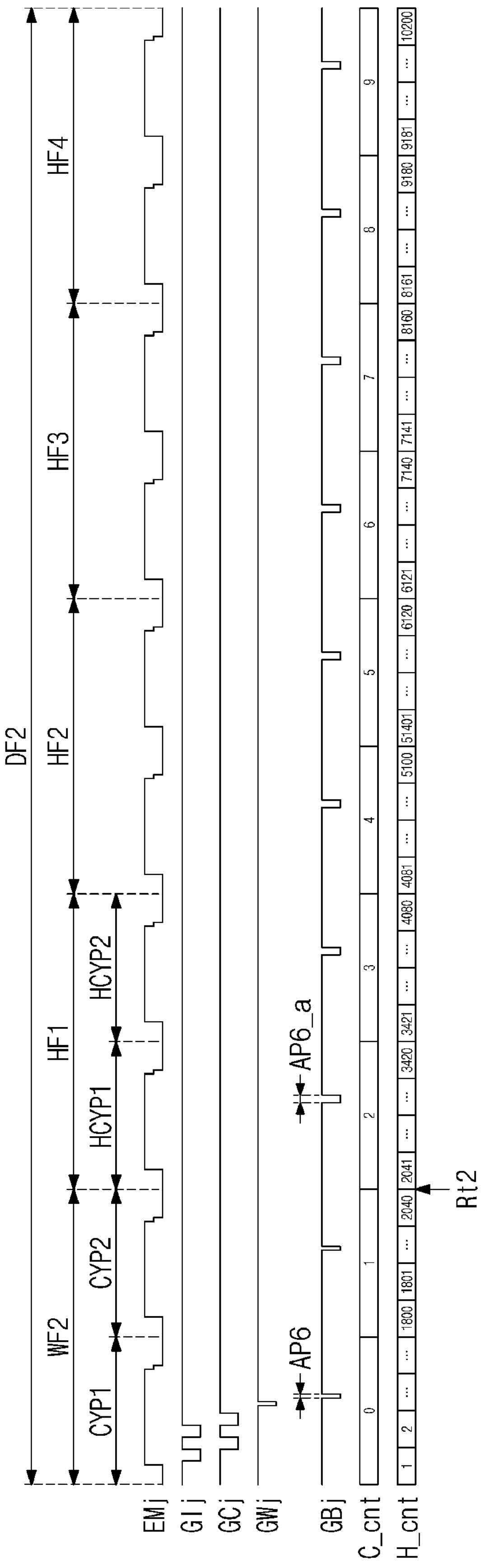
FIG. 10B is a timing diagram for describing a second compensation operation shown in FIG. 9.
Figure 10C:
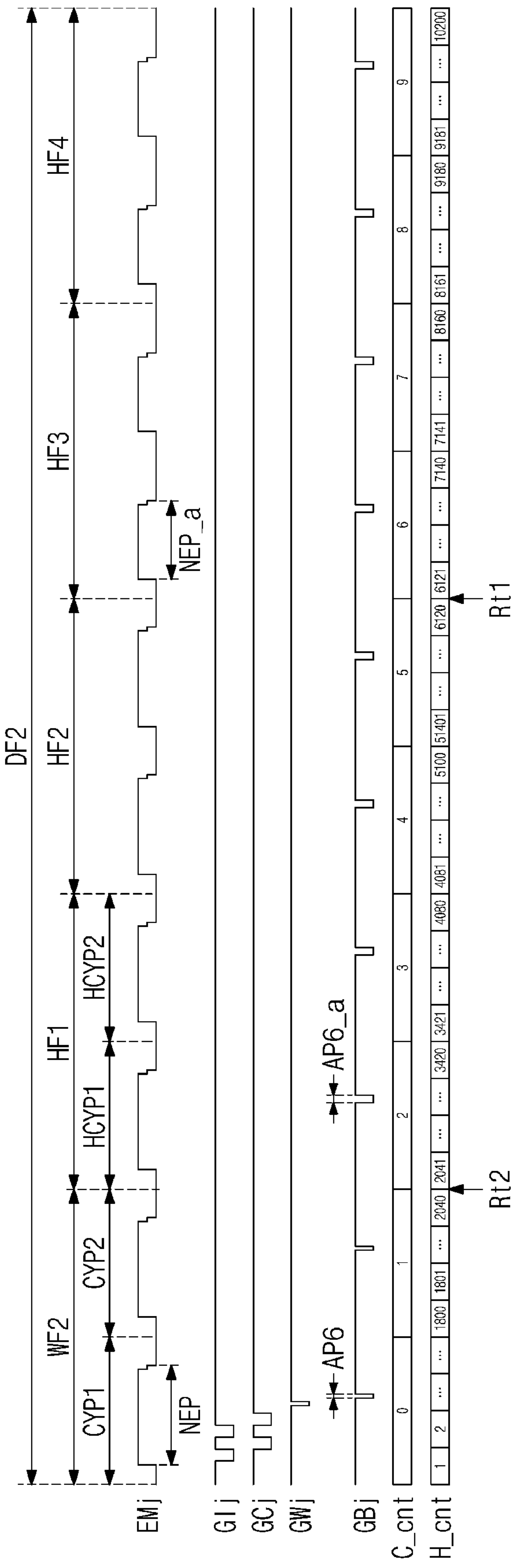
FIG. 10C is a timing diagram for describing a third compensation operation shown in FIG. 9.

FIG. 9 is a flowchart illustrating an embodiment of an operation process of a display device, according to the disclosure. FIG. 10A is a timing diagram for describing a first compensation operation shown in FIG. 9. FIG. 10B is a timing diagram for describing a second compensation operation shown in FIG. 9. FIG. 10C is a timing diagram for describing a third compensation operation shown in FIG. 9.

Referring to FIGS. 1 and 9, the panel driver PDD (e.g., the driving controller 100) in an embodiment of the disclosure may determine whether the display device DD operates in a variable frequency mode (S110). When the display device DD operates in the variable frequency mode, the panel driver PDD may initiate a compensation operation for adjusting a duty ratio of the emission control signal EMj (refer to FIG. 2A) and/or the black scan signal GBj (refer to FIG. 2A) (or also referred to as an "initialization control signal"). In an embodiment of the disclosure, the compensation operation may include a first compensation operation, a second compensation operation, and a third compensation operation.

The first compensation operation may be a compensation operation for controlling a duty ratio of the emission control signal EMj. The panel driver PDD may determine whether a ratio occupied by a first area (hereafter is also referred to as a "first reference grayscale area") having a first reference grayscale or a grayscale higher than the first reference grayscale with respect to the entirety of the display area DA is equal to or greater than a first threshold percentage, based on the image signal RGB (S120). In an embodiment of the disclosure, the first reference grayscale may be a relatively high grayscale (e.g., 127 grayscale). The first threshold percentage may be about 90%. When the determination result indicates that the area ratio of the first reference grayscale area is equal to or greater than the first threshold percentage, a first compensation operation is started.

Referring to FIGS. 9 and 10A, after the holding frame HF1 is started, the panel driver PDD may determine whether a first reference time point Rt1 is reached (S121). In the meantime, when the area ratio of the first reference grayscale area is less than the first threshold percentage, it is possible to move to the second compensation operation or the third compensation operation.

When the first reference time point Rt1 elapses after the start of the holding frame HF1, the panel driver PDD may adjust the duty ratio of the emission control signal EMj (S122).

The panel driver PDD (e.g., the driving controller 100) may count a horizontal synchronization signal by a predetermined clock signal. In particular, the driving controller 100 may generate a first counting signal H_cnt by counting the horizontal synchronization signal from the start time of the second driving frame DF2. The counting value of the first counting signal H_cnt may increase by 1 at each period of the horizontal synchronization signal. In an embodiment of the disclosure, the driving controller 100 may generate a second counting signal C_cnt by counting a cycle synchronization signal from the start time of the second driving frame DF2. The counting value of the second counting signal C_cnt may increase by 1 at each period of the cycle simultaneous signal. In an embodiment, when the first cycle period CYP1 is activated after the second driving frame DF2 is initiated, the second counting signal C_cnt may have a counting value corresponding to "0", for example. Afterward, when the second cycle period CYP2 is activated, the second counting signal C_cnt has a counting value corresponding to "1". Afterward, when the first holding cycle period HCYP1 is activated, the second counting signal C_cnt has a counting value corresponding to "2".

In the meantime, during the second write frame WF2 after the second driving frame DF2 is initiated, a horizontal synchronization signal is activated periodically. At the end of the write frame WF2, the first counting signal H_cnt counting the horizontal synchronization signal may have a counting value corresponding to "2040". Afterward, when the first holding frame HF1 is initiated, the first counting signal H_cnt may have a counting value corresponding to "2041".

In an embodiment of the disclosure, the first reference time point Rt1 may be set as a time point at which the second counting signal C_cnt becomes "6". When the second counting signal C_cnt is one between "0" and "5", the non-emission period NEP of the emission control signal EMj may have first duration. In the meantime, from a time point (e.g., the start time of the third holding frame HF3) at which the second counting signal C_cnt becomes "6", a non-emission period NEP_a of the emission control signal EMj may have second duration smaller than the first duration. FIG. 10A shows that the first reference time point Rt1 is set as a time point at which the second counting signal C_cnt is "6". However, the disclosure is not limited thereto. In an embodiment, the first reference time point Rt1 may be set as a time point at which the second counting signal C_cnt becomes "4" or "8", for example.

After adjusting the duty ratio of the emission control signal EMj, the panel driver PDD may determine whether the write frame WF2 is started (S123). When the write frame WF2 is not started, a procedure may move to operation S122. The panel driver PDD may readjust the duty ratio of the emission control signal EMj or may maintain the adjusted duty ratio of the emission control signal EMj. In the meantime, when the write frame WF2 is started, a procedure may move to operation S110. The panel driver PDD may determine whether the display device DD operates in the variable frequency mode.

When the area ratio of the first reference grayscale area is less than the first threshold percentage, the panel driver PDD may determine whether a ratio occupied by a second area (hereafter is also referred to as a "second reference grayscale area") having a second reference grayscale or a grayscale lower than the second reference grayscale with respect to the entirety of the display area DA is equal to or greater than a second threshold percentage (S130). In an embodiment of the disclosure, the second reference grayscale may be a relatively low grayscale (e.g., 23 grayscale). The second threshold percentage may be about 90%. When the determination result indicates that the area ratio of the second reference grayscale area is equal to or greater than the second threshold percentage, the second compensation operation is started.

Referring to FIGS. 9 and 10B, when the second compensation operation is started, the panel driver PDD may determine whether the first holding frame HF1 is started (S131). In the meantime, when the area ratio of the second reference grayscale area is less than the second threshold percentage, it is possible to move to the third compensation operation.

When the first holding frame HF1 is started, the panel driver PDD may adjust the duty ratio of the black scan signal GBj from the start time (i.e., a second reference time point Rt2) of the first holding frame HF1 (S132).

In an embodiment of the disclosure, FIG. 10B shows that the second reference time point Rt2 is the start time of the first holding frame HF1, but the disclosure is not limited thereto. The second reference time point Rt2 may be the start time of the second holding frame HF2 or the start time of the second holding cycle period HCYP2 of the first holding frame HF1.

The panel driver PDD may determine whether the second reference time point Rt2 is reached, based on the first and second counting signals H_cnt and C_cnt.

During the write frame WF2, the active period AP6 of the black scan signal GBj may have third duration. After the second reference time point Rt2, an active period AP6_*a* of the black scan signal GBj may have fourth duration greater than the third duration. In an embodiment, the fourth duration may be twice as long as the third duration, for example.

After adjusting the duty ratio of the black scan signal GBj, the panel driver PDD may determine whether the write frame WF2 is started (S133). When the write frame WF2 is not started, a procedure may move to operation S132. The panel driver PDD may readjust the duty ratio of the black scan signal GBj or may maintain the adjusted duty ratio of the black scan signal GBj. In the meantime, when the write frame WF2 is started, a procedure may move to operation S110. The panel driver PDD may determine whether the display device DD operates in the variable frequency mode.

When the area ratio of the second reference grayscale area is less than the second threshold percentage, the panel driver PDD initiates the third compensation operation.

Referring to FIGS. 9 and 10C, when the third compensation operation is started, the panel driver PDD may determine whether the first holding frame HF1 is started (S140).

When the first holding frame HF1 is started, the panel driver PDD may adjust the duty ratio of the black scan signal GBj from the start time (i.e., a second reference time point Rt2) of the first holding frame HF1 (S141).

During the write frame WF2, the active period AP6 of the black scan signal GBj may have the third duration. After the second reference time point Rt2, the active period AP6_*a* of the black scan signal GBj may have fourth duration greater than the third duration.

After adjusting the duty ratio of the black scan signal GBj, the panel driver PDD may determine whether the first reference time point Rt1 is reached (S142). When the first reference time point Rt1 elapses after the start of the holding frame HF1, the panel driver PDD may adjust the duty ratio of the emission control signal EMj (S143).

After adjusting the duty ratio of the emission control signal EMj, the panel driver PDD may determine whether the write frame WF2 is started (S144). When the write frame WF2 is not started, a procedure may move to operation S143. The panel driver PDD may readjust the duty ratio of the emission control signal EMj or may maintain the adjusted duty ratio of the emission control signal EMj. In the meantime, when the write frame WF2 is started, a procedure may move to operation S110. The panel driver PDD may determine whether the display device DD operates in the variable frequency mode.

As such, the panel driver PDD may perform a compensation operation different depending on whether an image displayed on the display area DA is a relatively high grayscale image or a relatively low grayscale image, by analyzing the image signal RGB. Accordingly, it is possible to improve a luminance deviation that appears when a relatively low grayscale image is displayed while improving a flicker phenomenon that occurs when a relatively high grayscale image is displayed.

Figure 11:
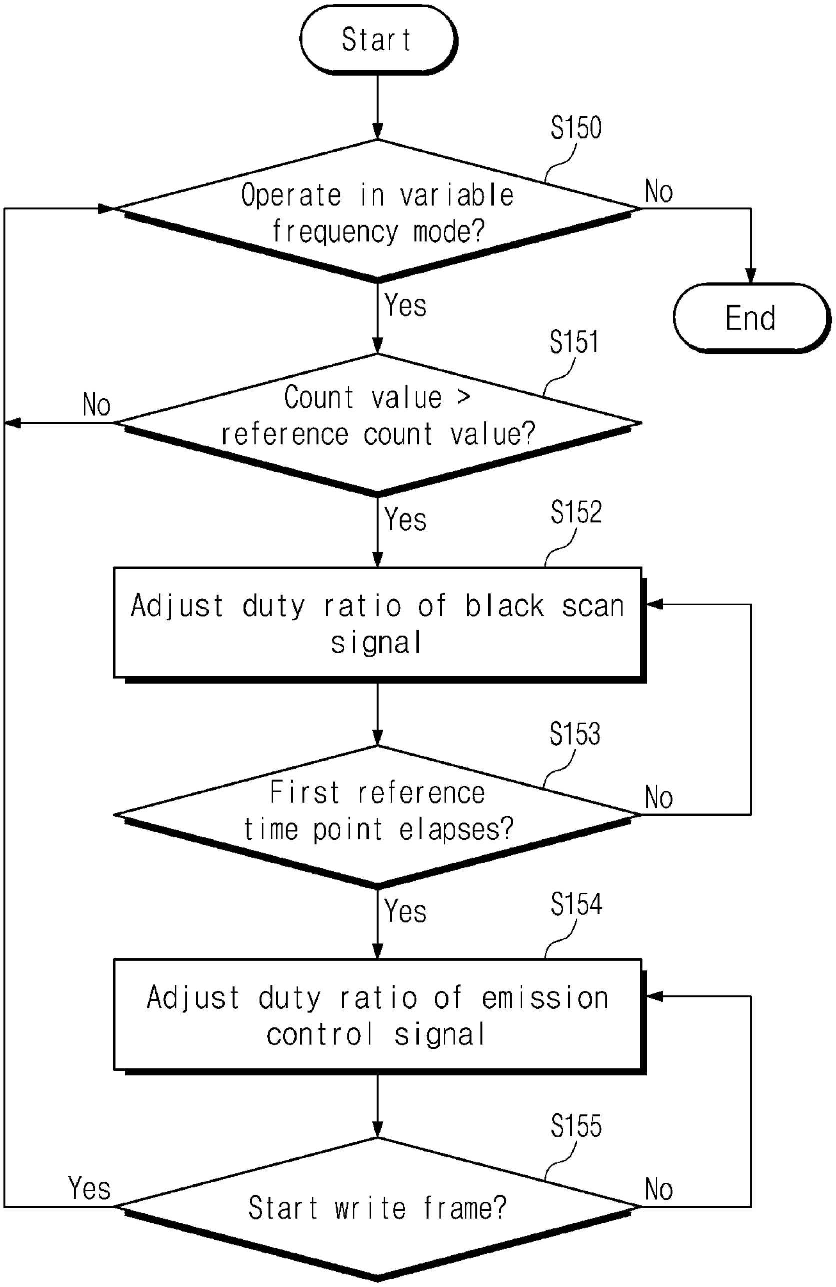
FIG. 11 is a flowchart illustrating an embodiment of an operation process of a display device, according to the disclosure.

FIG. 11 is a flowchart illustrating an embodiment of an operation process of a display device, according to the disclosure.

Referring to FIGS. 11 and 10C, the panel driver PDD (e.g., the driving controller 100) in an embodiment of the disclosure may determine whether the display device DD operates in a variable frequency mode (S150). When the display device DD operates in the variable frequency mode, the panel driver PDD may initiate a compensation operation for adjusting a duty ratio of the emission control signal EMj (refer to FIG. 2A) and the black scan signal GBj (refer to FIG. 2A) (or also referred to as an "initialization control signal").

When the compensation operation is started, the panel driver PDD may compare a count value and a predetermined reference count value (S151). Here, the count value may be a current count value of the first counting signal H_cnt. The reference count value may be one count value selected from count values of the first counting signal H_cnt. In an alternative embodiment, the count value may be a current count value of the second count signal C_cnt. The reference count value may be one count value selected from count values of the second count signal C_cnt.

When the count value does not exceed the reference count value, a procedure may move to operation S150. The panel driver PDD may again determine whether to operate in the variable frequency mode. In the meantime, when the count value exceeds the reference count value at the second reference time point Rt2, the panel driver PDD may adjust the duty ratio of the black scan signal GBj (S152).

During the write frame WF2, the active period AP6 of the black scan signal GBj may have the third duration. After the second reference time point Rt2, the active period AP6_a of the black scan signal GBj may have fourth duration greater than the third duration.

After adjusting the duty ratio of the black scan signal GBj, the panel driver PDD may determine whether the first reference time point Rt1 is reached (S153). When the first reference time point Rt1 elapses after the start of the first holding frame HF1, the panel driver PDD may adjust the duty ratio of the emission control signal EMj (S154). When the first reference time point Rt1 has not elapsed, a procedure may move to operation S152. The panel driver PDD may readjust the duty ratio of the black scan signal GBj or may maintain the adjusted duty ratio of the black scan signal GBj.

After adjusting the duty ratio of the emission control signal EMj, the panel driver PDD may determine whether the write frame WF2 is started (S155). When the write frame WF2 is not started, a procedure may move to operation S154. The panel driver PDD may readjust the duty ratio of the emission control signal EMj or may maintain the adjusted duty ratio of the emission control signal EMj. In the meantime, when the write frame WF2 is started, a procedure may move to operation S150. The panel driver PDD may determine whether the display device DD operates in the variable frequency mode.

As such, the panel driver PDD may perform a compensation operation after the variable frequency mode is entered while omitting an operation of analyzing the image signal RGB. Accordingly, it is possible to improve a luminance deviation that appears when a relatively low grayscale image is displayed while improving a flicker phenomenon that occurs when a relatively high grayscale image is displayed.

Figure 12A:
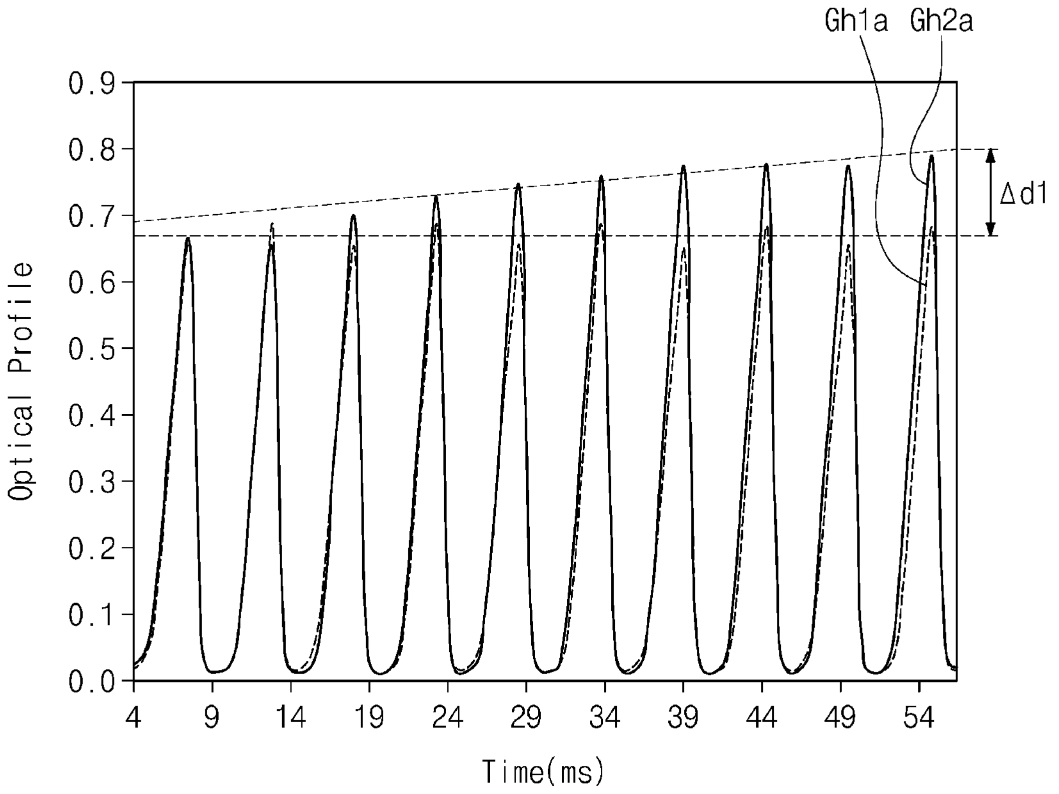
FIG. 12A is a waveform diagram illustrating an optical profile at a relatively low grayscale when a duty ratio of a black scan signal is not changed.
Figure 12B:
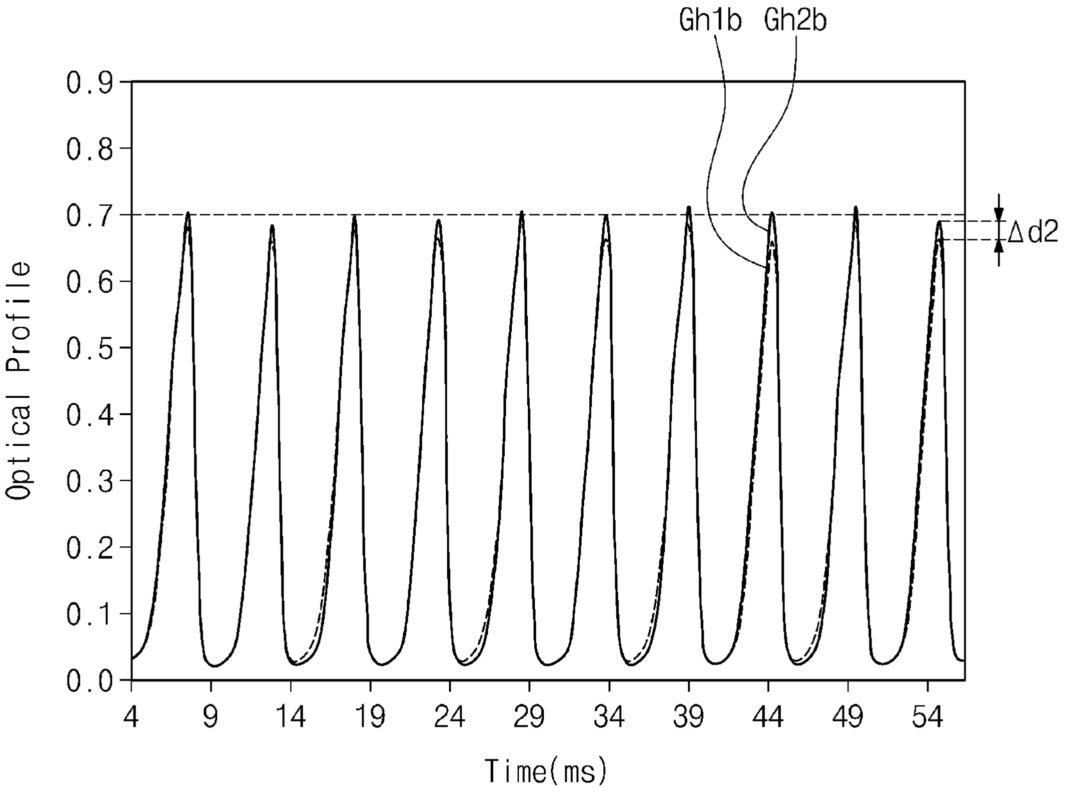
FIG. 12B is a waveform diagram illustrating an optical profile at a relatively low grayscale when a duty ratio of a black scan signal is changed.

FIG. 12A is a waveform diagram illustrating an optical profile at a relatively low grayscale when a duty ratio of a black scan signal is not adjusted. FIG. 12B is a waveform diagram illustrating an optical profile at a relatively low grayscale when a duty ratio of a black scan signal is changed.

In FIG. 12A, a first graph Gh1*a* indicates a first optical profile measured at a predetermined grayscale (e.g., 11 grayscale) during an operation at a relatively high frequency (e.g., about 240 Hz) in a variable frequency mode. In FIG. 12A, a second graph Gh2*a* indicates a second optical profile measured at a predetermined grayscale during an operation at a relatively low frequency (e.g., about 48 Hz) in the variable frequency mode. In particular, in FIG. 12A, the second graph Gh2*a* shows an optical profile measured in a state where the duty ratio of the black scan signal GBj (refer to FIG. 10C) is not changed even after the holding frames HF1, HF2, HF3, and HF4 are entered. It is indicated that the second optical profile gradually increases when the black scan signal GBj has the same duty ratio during high-frequency driving and low-frequency driving. That is, it is indicated that a difference Δd1 between the first and second optical profiles increases as time elapses.

In the meantime, in FIG. 12B, a first graph Gh1*b* indicates a first optical profile measured at a predetermined grayscale (e.g., 11 grayscale) during an operation at a relatively high frequency (e.g., about 240 Hz) in a variable frequency mode. In FIG. 12B, a second graph Gh2*b* indicates a second optical profile measured at a predetermined grayscale during an operation at a relatively low frequency (e.g., about 48 Hz) in the variable frequency mode. In particular, in FIG. 12B, the second graph Gh2*b* shows an optical profile measured in a state where the duty ratio of the black scan signal GBj (refer to FIG. 10C) is changed (i.e., increased) even after the holding frames HF1, HF2, HF3, and HF4 are entered.

When the duty ratio of the black scan signal GBj is adjusted (i.e., increased) during low-frequency driving, a gradual increase in the second optical profile may be prevented. Accordingly, as time elapses, a difference Δd2 between the first and second optical profiles does not increase, thereby improving a luminance deviation between high-frequency driving and low-frequency driving.

Figure 13A:
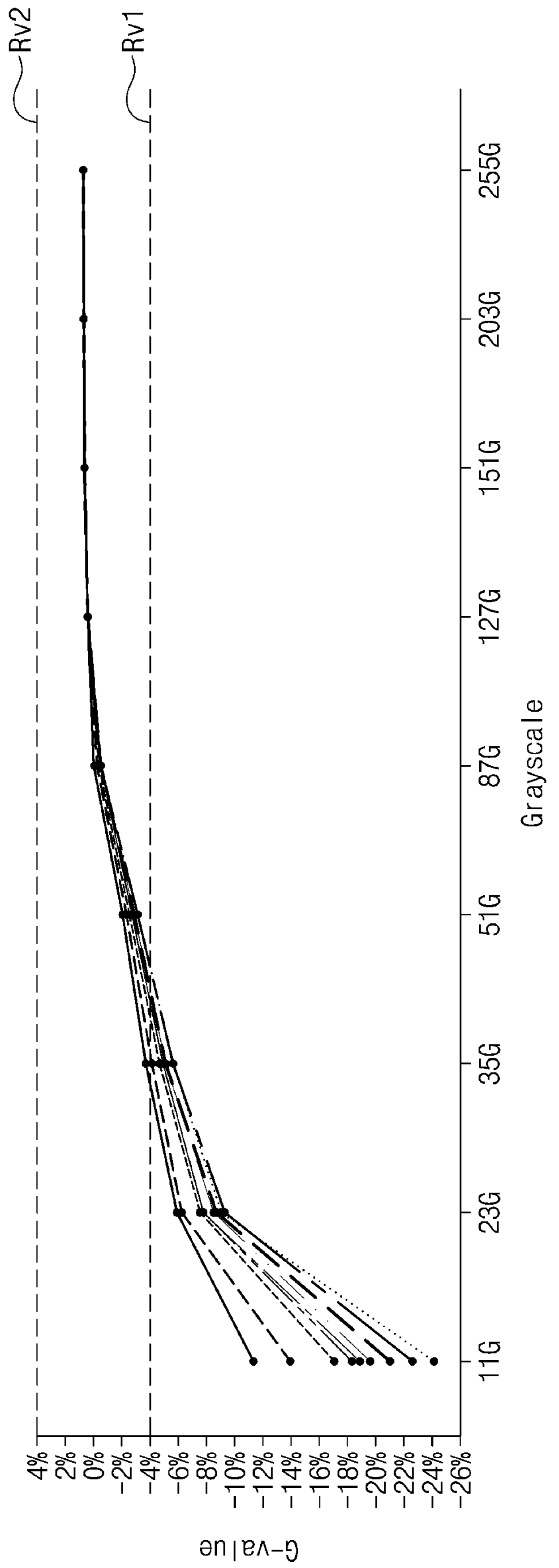
FIG. 13A is a graph showing comparison values for each grayscale of target display devices in each of which the duty ratio of a black scan signal is not adjusted.
Figure 13B:
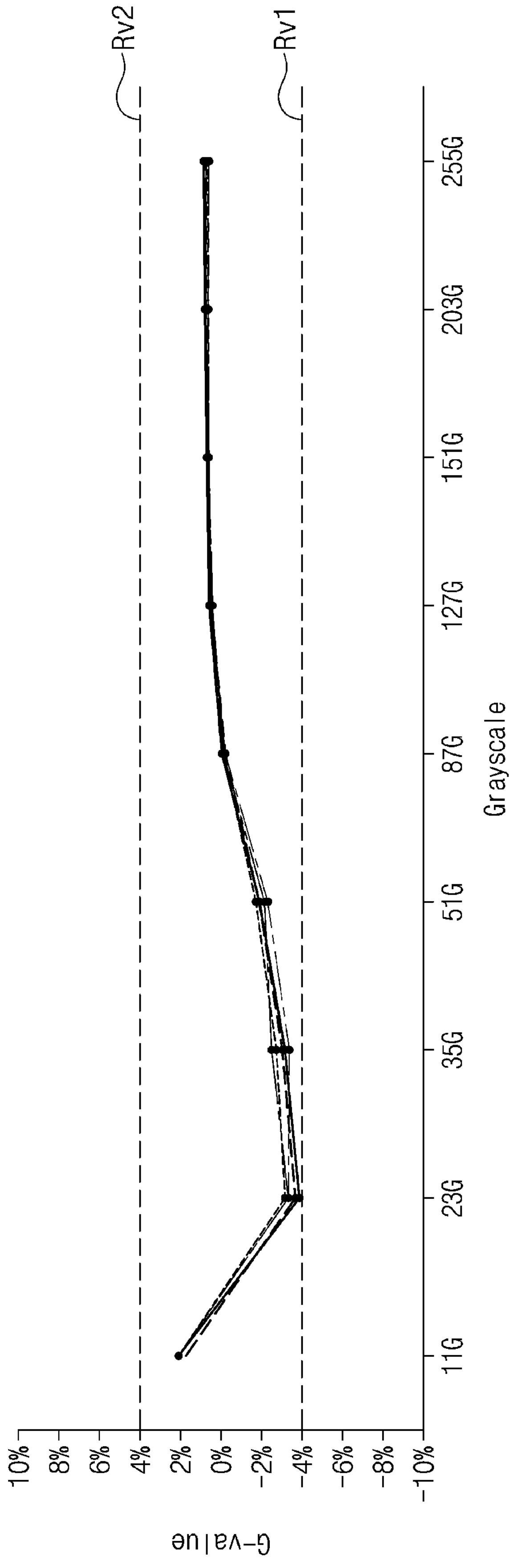
FIG. 13B is a graph showing comparison values for each grayscale of target display devices in each of which the duty ratio of the black scan signal is adjusted.

FIG. 13A is a graph showing comparison values for each grayscale of target display devices in each of which the duty ratio of a black scan signal is not adjusted. FIG. 13B is a graph showing comparison values for each grayscale of target display devices in each of which the duty ratio of the black scan signal is adjusted.

FIG. 13A shows a comparison value (G-value (%)) measured for each grayscale of target display devices, in each of which the duty ratio of the black scan signal GBj is not adjusted, during an operation at a relatively low frequency (e.g., about 48 Hz). It is indicated that luminance increases at a relatively low grayscale and then comparison values decreases to the predetermined first reference value Rv1 or lower (e.g., about −4%) when the duty ratio of the black scan signal GBj is not adjusted at a time point at which a holding frame is started after a variable frequency mode is entered.

However, referring to FIG. 13B, it is indicated that the luminance decreases at a relatively low grayscale and then the comparison values are within a reference range when the duty ratio of the black scan signal GBj is adjusted (increased) at a time point at which a holding frame is started after the variable frequency mode is entered. Here, a reference range may be set to be greater than or equal to the predetermined first reference value Rv1 and to be less than or equal to the predetermined second reference value Rv2 (e.g., about 4%).

Accordingly, a luminance difference occurs between high-frequency driving and low-frequency driving may be improved.

Although an embodiment of the disclosure has been described for illustrative purposes, those skilled in the art will appreciate that various modifications, and substitutions are possible, without departing from the scope and spirit of the disclosure as disclosed in the accompanying claims. Accordingly, the technical scope of the disclosure is not limited to the detailed description of this specification, but should be defined by the claims.

In an embodiment of the disclosure, issues of lowering the luminance uniformity of a display device due to the relatively small luminance difference between high-frequency driving and low-frequency driving in a variable frequency mode may be solved or reduced.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:

a display panel including a plurality of pixels, each of the plurality of pixels including:
- a light-emitting element; and
- a pixel driving circuit connected to a first electrode of the light-emitting element; and a panel driver which drives the display panel in a first mode where an operating frequency is fixed, and a second mode where the operating frequency is variable, the panel driver comprising a driving controller and a voltage generator, wherein the driving controller determines whether the operating frequency corresponds to one of predetermined compensation frequencies in the second mode, and outputs a voltage control signal depending on a determination result, the voltage generator changes a voltage level of an anode initialization voltage applied to the first electrode in response to the voltage control signal, wherein, in the second mode, the operating frequency is changed in units of a driving frame, wherein the driving frame includes a first driving frame, in which the operating frequency has a first operating frequency, and a second driving frame in which the operating frequency has a second operating frequency lower than the first operating frequency, wherein the first driving frame includes a first write frame, wherein the second driving frame includes a second write frame and a holding frame, and wherein the voltage level of the anode initialization voltage is changed in the holding frame.

2. The display device of claim 1, wherein the voltage level of the anode initialization voltage is changed at a start time of the holding frame.

3. The display device of claim 1, wherein the pixel driving circuit includes:

an anode initialization transistor which is connected between the first electrode of the light-emitting element and an anode initialization voltage line and operates in response to an initialization control signal, and wherein the anode initialization voltage is supplied to the anode initialization voltage line.

4. The display device of claim 3, wherein the initialization control signal includes an active period activated within the first write frame, the second write frame, and the holding frame, and wherein the anode initialization transistor outputs the anode initialization voltage to the first electrode during the active period.

5. The display device of claim 4, wherein, in a case that the second operating frequency corresponds to one of the predetermined compensation frequencies, the anode initialization voltage has a first voltage level during the second write frame and has a second voltage level lower than the first voltage level during the at least one holding frame.

6. The display device of claim 1, wherein the anode initialization voltage is changed in units of the at least one holding frame.

7. The display device of claim 1, wherein the second write frame has a duration identical to a duration of the first write frame.

8. The display device of claim 7, wherein the second write frame includes a plurality of cycle periods, wherein the holding frame includes a plurality of holding cycle periods, and wherein each of the plurality of holding cycle periods has a duration equal to a duration of each of the plurality of cycle periods.

9. The display device of claim 8, wherein the anode initialization voltage is changed in units of at least one holding cycle period among the plurality of holding cycle periods.

10. An electronic device comprising:

a display device comprising:
- a display panel including a plurality of pixels, each of the plurality of pixels including:
  - a light-emitting element; and
  - a pixel driving circuit connected to a first electrode of the light-emitting element; and
- a panel driver which drives the display panel in a first mode where an operating frequency is fixed, and a second mode where the operating frequency is variable, the panel driver comprising a driving controller and a voltage generator, wherein the driving controller determines whether the operating frequency corresponds to one of predetermined compensation frequencies in the second mode, and outputs a voltage control signal depending on a determination result; and the voltage generator changes a voltage level of an anode initialization voltage applied to the first electrode in response to the voltage control signal, wherein, in the second mode, the operating frequency is changed in units of a driving frame, wherein the driving frame includes a first driving frame, in which the operating frequency has a first operating frequency, and a second driving frame in which the operating frequency has a second operating frequency lower than the first operating frequency, wherein the first driving frame includes a first write frame, and wherein the second driving frame includes a second write frame and a holding frame, wherein the voltage level of the anode initialization voltage is changed in the holding frame.

11. The electronic device of claim 10, wherein the voltage level of the anode initialization voltage is changed at a start time of the holding frame.

12. The electronic device of claim 10, wherein the pixel driving circuit includes:

an anode initialization transistor which is connected between the first electrode of the light-emitting element and an anode initialization voltage line and operates in response to an initialization control signal, and wherein the anode initialization voltage is supplied to the anode initialization voltage line.

13. The electronic device of claim 12, wherein the initialization control signal includes an active period activated within the first write frame, the second write frame, and the holding frame, and wherein the anode initialization transistor outputs the anode initialization voltage to the first electrode during the active period.

* * * * *